United States Patent
Takabatake et al.

(10) Patent No.: US 9,060,115 B2
(45) Date of Patent: Jun. 16, 2015

(54) IMAGE CAPTURING SYSTEM AND METHOD OF GENERATING IMAGE DATA

(71) Applicant: PFU Limited, Kahoku-shi, Ishikawa (JP)

(72) Inventors: Masanari Takabatake, Ishikawa (JP); Yuki Kasahara, Ishikawa (JP)

(73) Assignee: PFU Limited, Ishikawa (JP)

(*) Notice: Subject to any disclaimer, the term of this patent is extended or adjusted under 35 U.S.C. 154(b) by 0 days.

(21) Appl. No.: 14/188,443

(22) Filed: Feb. 24, 2014

(65) Prior Publication Data

US 2015/0138432 A1    May 21, 2015

(30) Foreign Application Priority Data

Nov. 15, 2013    (JP) .................................. 2013-237285

(51) Int. Cl.
*H04N 5/225*    (2006.01)

(52) U.S. Cl.
CPC ........... *H04N 5/2256* (2013.01); *H04N 5/2251* (2013.01)

(58) Field of Classification Search
CPC .......... H04N 1/02825; H04N 1/02845; H04N 1/02865; H04N 1/0288
USPC .......... 348/239, 241, 370–371; 358/450, 475, 358/509; 382/264, 274, 275
See application file for complete search history.

(56) References Cited

U.S. PATENT DOCUMENTS

| | | | |
|---|---|---|---|
| 6,965,460 B1* | 11/2005 | Gann et al. ..................... | 358/471 |
| 7,136,537 B2* | 11/2006 | Pilu et al. ...................... | 382/274 |
| 2001/0002850 A1* | 6/2001 | Slatter ........................... | 348/370 |
| 2006/0033835 A1* | 2/2006 | Pollard et al. ................. | 348/370 |

FOREIGN PATENT DOCUMENTS

| | | |
|---|---|---|
| JP | 07-007605 A | 1/1995 |
| JP | 08-336065 A | 12/1996 |
| JP | 2001-268323 A | 9/2001 |
| JP | 2003-032445 A | 1/2003 |
| JP | 2003-130993 A | 5/2003 |
| JP | 2005-062753 A | 3/2005 |
| JP | 2005-130326 A | 5/2005 |

OTHER PUBLICATIONS

Japanese Office Action issued in Application No. 2013-237285 dated Nov. 18, 2014 with English Translation.

* cited by examiner

*Primary Examiner* — Mekonnen Dagnew
(74) *Attorney, Agent, or Firm* — McDermott Will & Emery LLP

(57) ABSTRACT

An image capturing system includes an image capturing unit configured to photograph the medium on a medium installation face, a lighting configured to irradiate the medium installation face, a lighting control unit configured to control the lighting, and a non-readable area determining unit configured to determine whether there is a non-readable area from which the image capturing unit is unable to read information of the medium due to reflected light of the lighting. The non-readable area is determined based on an image acquired by photographing the medium in a turned-on state of the lighting. When the non-readable area determining unit determines that there is the non-readable area, the medium is photographed in different lighting states set by the lighting control unit, and among the image data generated in photographing process, image data corresponding to the medium is generated by synthesizing areas except an area corresponding to the non-readable area.

7 Claims, 18 Drawing Sheets

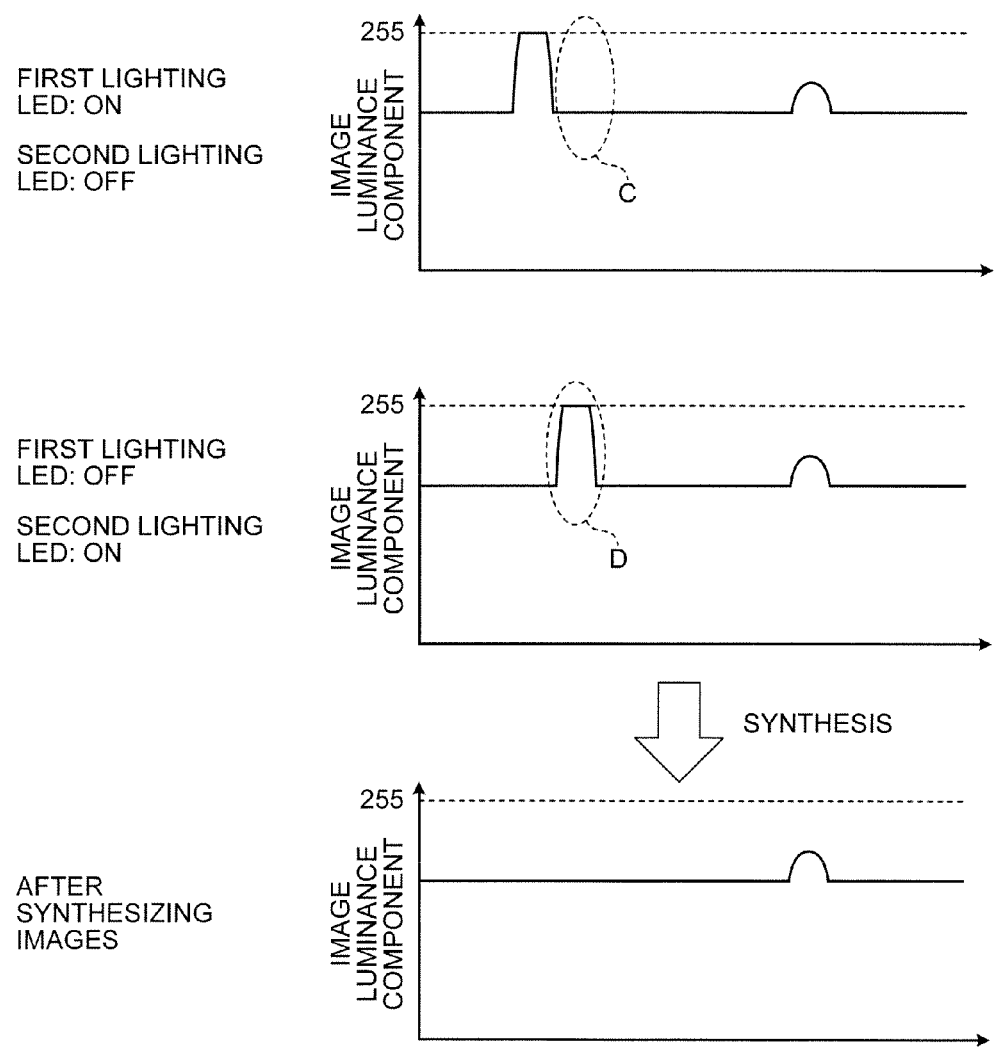

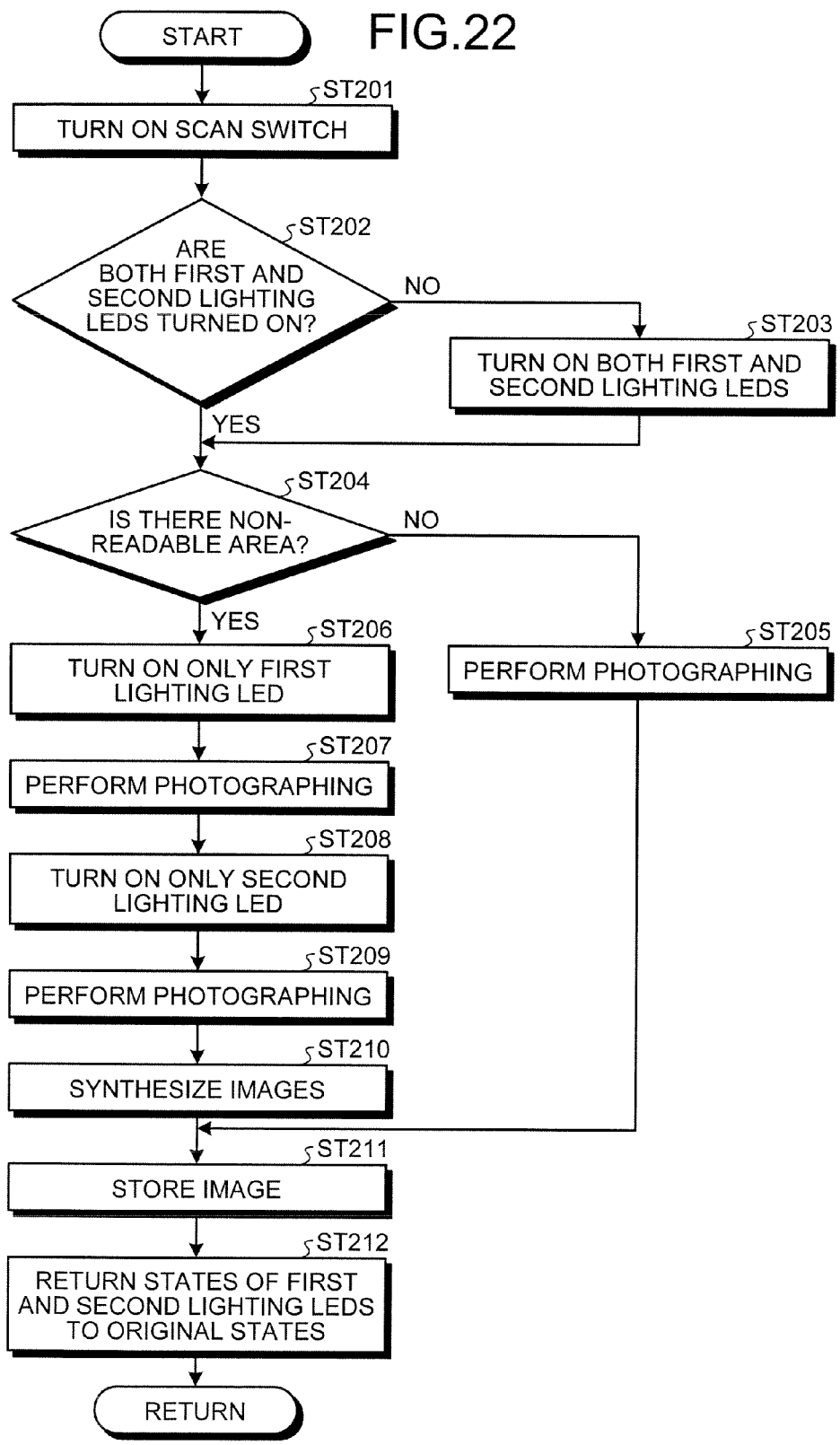

IMAGE CAPTURING SYSTEM AND METHOD OF GENERATING IMAGE DATA

CROSS-REFERENCE TO RELATED APPLICATIONS

This application is based upon and claims the benefit of priority from Japanese Patent Application No. 2013-237285, filed Nov. 15, 2013, the entire contents of which are incorporated herein by reference.

BACKGROUND OF THE INVENTION

1. Field of the Invention

The present invention relates to an image capturing system and a method of generating image data.

2. Description of the Related Art

When an object is photographed using an image capturing unit such as a camera, there are many cases where the object is photographed using not only natural light but also light emitted from a light source such as a fluorescent lamp or LEDs. However, when the object is photographed using light emitted from the light source, there are cases where the emission light is specularly reflected on the surface of a document depending on materials thereof, which degrades the quality of an image. Thus, there are conventional image reading devices in which a light source is arranged at a position facing a direction in which specularly-reflected light reflected on the document is not incident to the image capturing unit (for example, Japanese Laid-open Patent Publication No. 7-7605 and Japanese Patent No. 3759887). In addition, there is another technique for suppressing the degradation of the quality of the image due to specular reflection on the document in which two light sources are arranged and emit light in a time divisional manner, the object is photographed using the image capturing unit at the time of emitting light from each light source, and the two images are synthesized together (for example, Japanese Laid-open Patent Publication No. 2001-268323).

However, when the document that is the object is curved, a position at which specular reflection is made on the document may be different from a position at which specular reflection is made on a flat document. Accordingly, when the position of the light source is arranged at the position at which specularly reflected light reflected on the flat document travels toward a direction other than the direction for the image capturing unit, in a case where a document to be photographed is curved, there is concern that specularly reflected light reflected on the document travels toward the image capturing unit and is incident to the image capturing unit.

In addition, since specular reflection differs depending on materials of a document, there are cases where emission light emitted from the light source is not specularly reflected on the document. In such a case, even when two light sources are arranged, there are cases where it is not necessary to cause the two light sources to emit light in the time divisional manner and to synthesize two images. Accordingly, it is very difficult to appropriately decrease the degradation of the image quality due to specularly reflected light reflected from the document regardless of the form of the document.

The present invention is contrived in consideration of the description presented above, and an object thereof is to provide an image capturing system and a method of generating image data capable of appropriately acquiring a high-quality image.

It is an object of the present invention to at least partially solve the problems in the conventional technology.

According to an aspect of the present invention, an image capturing system comprises a base unit arranged on a medium installation face on which a medium that is a reading target is installed, an arm unit extending upwardly from the base unit, a top unit extending from the arm unit so as to face the medium installation face, an image capturing unit configured to photograph the medium, a lighting disposed in the top unit and configured to irradiate the medium installation face, a lighting control unit configured to control driving of the lighting, and a non-readable area determining unit configured to determine whether or not there is a non-readable area from which the image capturing unit is unable to read information of the medium due to reflected light of the lighting by the medium, based on an image corresponding to the medium that is acquired by performing a photographing process in a turned-on state of the lighting before image data of the medium captured by the image capturing unit is stored. When the non-readable area determining unit determines that there is the non-readable area, a lighting state of the lighting is set to be different by the lighting control unit, and the medium is photographed by the image capturing unit in states in which the lighting states are different from each other, and, among the image data generated in each photographing process, image data corresponding to the medium is generated by synthesizing areas except for an area corresponding to the non-readable area.

According to further aspect of the present invention, in a method of generating image data in an image capturing system including a base unit arranged on a medium installation face on which a medium that is a reading target is installed, an arm unit extending upwardly from the base unit, a top unit extending from the arm unit so as to face the medium installation face, an image capturing unit configured to photograph the medium, and a lighting disposed in the top unit and configured to irradiate the medium installation face, the method comprises performing a first photographing process in a turned-on state of the lighting to acquire an image corresponding to the medium, determining whether there is a non-readable area from which the image capturing unit is unable to read information of the medium due to reflected light of the lighting in the medium based on the image corresponding to the medium that is acquired in the first photographing process, setting lighting states of the lighting so that the lighting states are different from each other in a case where it is determined that there is the non-readable area in the determining step, performing second photographing process to photograph the medium in states in which the lighting states are different from each other by using the image capturing unit, generating image data corresponding to the medium by synthesizing areas except for an area corresponding to the non-readable area among image data generated in the second photographing process, and storing the image data generated in the generating step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic diagram illustrating an image that is in a state in which a non-readable area occurs on a medium when a lighting LED is turned on;

FIG. 17 is a schematic diagram illustrating an image that is captured with only a first lighting LED being turned on;

FIG. 18 is a schematic diagram illustrating an image that is captured with only a second lighting LED being turned on;

FIG. 19 is a schematic diagram illustrating an image that is acquired by synthesizing the image acquired when only the first lighting LED is turned on and the image acquired when only the second lighting LED is turned on;

FIG. 20 is a schematic diagram that illustrates dimmer control performed by an image capturing unit when the first and second lighting LEDs are turned on;

FIG. 21 is a schematic diagram that illustrates a synthesizing technique used for synthesizing image data acquired when only the first lighting LED is turned on and image data acquired when only the second lighting LED is turned on; and FIG. 22 is a flowchart that illustrates a control sequence at the time of scanning a medium in the image capturing system illustrated in FIG. 13.

DETAILED DESCRIPTION OF THE PREFERRED EMBODIMENTS

Hereinafter, image capturing systems and methods of generating image data according to embodiments of the present invention will be described in detail with reference to the drawings. However, the present invention is not limited to such embodiments. In addition, in constituent elements of the embodiment described below, elements with which the constituent elements can be replaced by those skilled in the art or elements that are substantially the same as the constituent element are included.

Figure 1:
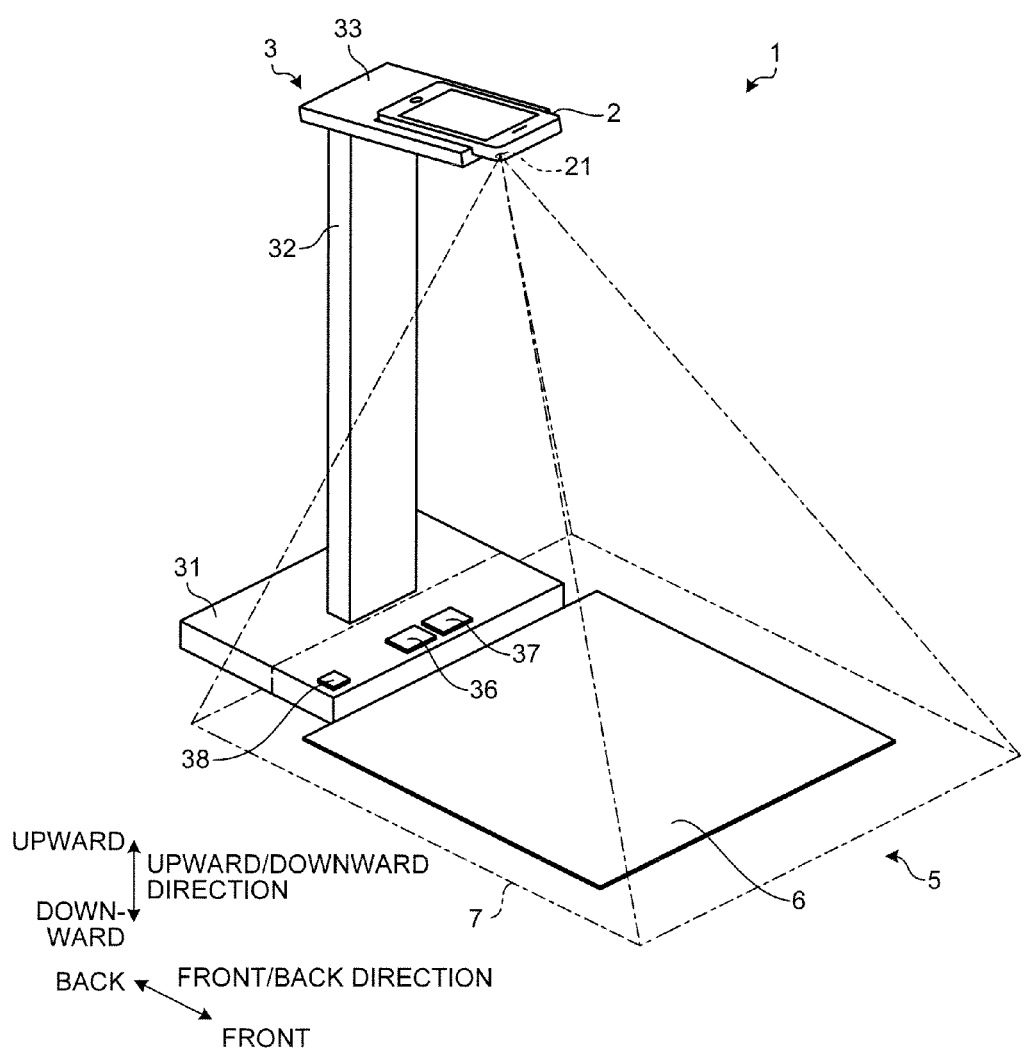
FIG. 1 is a perspective view that illustrates a schematic configuration of an image capturing system according to a first embodiment.
Figure 2:
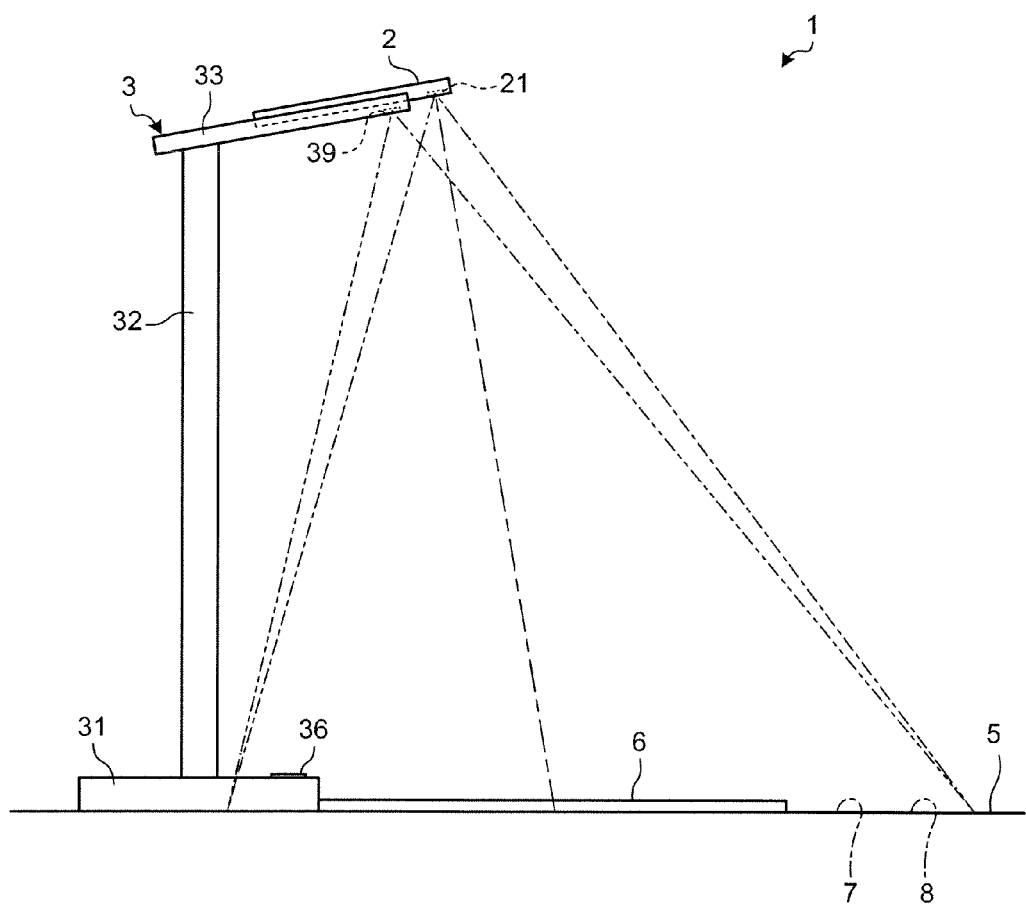
FIG. 2 is a side view of the image capturing system illustrated in FIG. 1.
Figure 3:
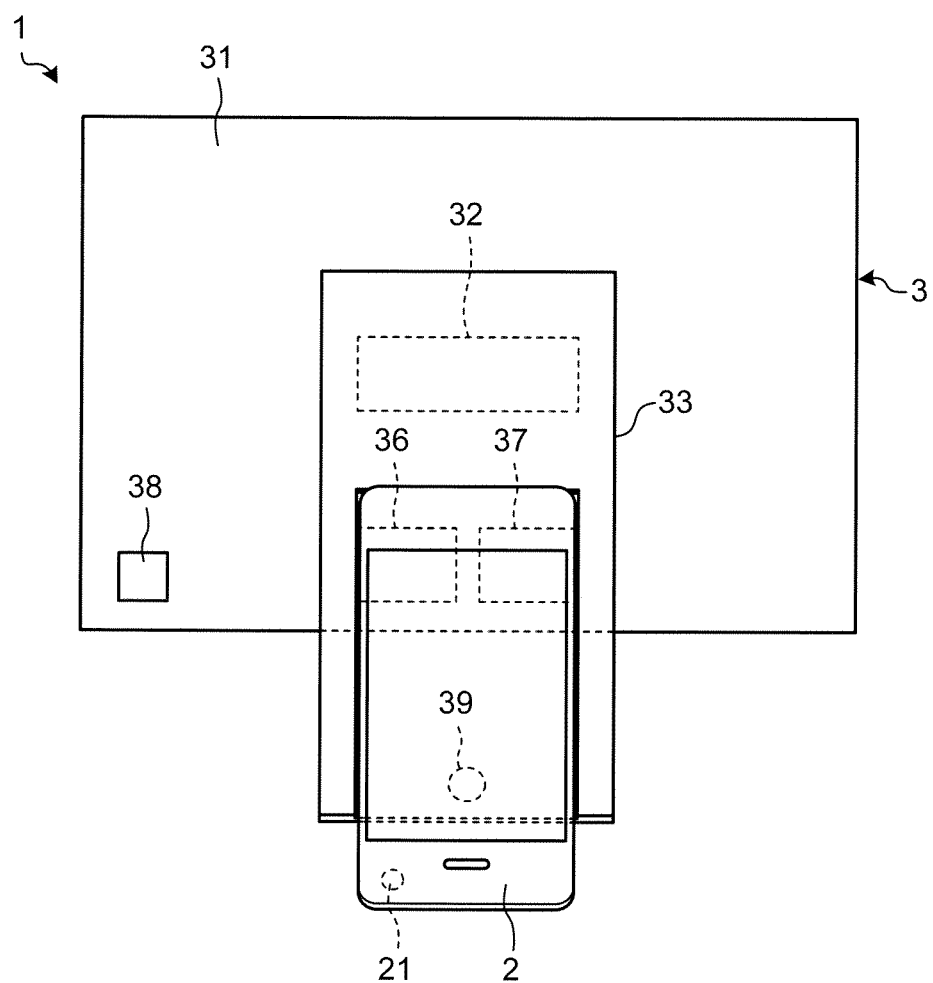
FIG. 3 is a plan view of the image capturing system illustrated in FIG. 1.

FIG. 1 is a perspective view that illustrates a schematic configuration of an image capturing system according to a first embodiment. FIG. 2 is a side view of the image capturing system illustrated in FIG. 1. FIG. 3 is a plan view of the image capturing system illustrated in FIG. 1. An image capturing system 1 illustrated in the FIGS. 1 to 3 is a scanner system that performs a scanning operation of generating image data of a medium 6 by photographing the medium 6 that is a reading target disposed on a medium installation face 5 from the upper side by a predetermined image capturing unit. In the first embodiment, as an example of the image capturing unit, a smartphone 2 having a camera function will be described.

The image capturing system 1 according to the first embodiment is equipped with a smartphone 2 and a lighting device 3 which can mount the smartphone 2 at the time of scanning by performing photographing using the smartphone 2. When the smartphone 2 is mounted at a predetermined position (on a mounting face 34 to be described later) of the lighting device 3, the image capturing system 1 can position the smartphone 2 precisely and can acquire a scan image of a predetermined area 7 to be photographed (hereinafter, photographed area 7) using the smartphone 2. In the description presented below, the upward/downward direction in FIG. 1 will be described as the upward/downward direction of the image capturing system 1 and the lighting device 3, the front side in FIG. 1 will be described as the front direction of the image capturing system 1 and the lighting device 3, and the rear side in FIG. 1 will be described as the back direction of the image capturing system 1 and the lighting device 3. That is, with respect to the image capturing system 1, specifically, with respect to a base 31, as disclosed in FIG. 1, a side facing the medium 6 is defined as the front side of the image capturing system 1 and the lighting device 3, and an opposite side to the front side is defined as the back side of the image capturing system 1 and the lighting device 3. A direction from the back side of the image capturing system 1 toward the front side of the image capturing system is defined as a front direction, and a direction opposite to the front direction is defined as a back direction.

On the rear face of the smartphone 2, an image capturing unit 21 performing a camera function is disposed. The image capturing unit 21 can perform a scanning operation (here, "scanning operation" means photographing a predetermined photographed area 7, as described in the specification later) in accordance with an operation instruction transmitted from a CPU 25 (FIG. 5) of the smartphone 2. In a state in which the smartphone 2 is mounted on the mounting face 34 of the lighting device 3, the image capturing unit 21 can photograph the entirety of a predetermined photographed area 7 and generate a scanned image (i.e., a photographed image) including the entirety of the photographed area 7.

The lighting device 3 is equipped with three members of a base unit 31, an arm unit 32, and a top unit 33. Among these, the base unit 31 is arranged on the medium installation face 5. The arm unit 32 is connected to the upper face of the base unit 31 and upwardly extends from the base unit 31. Here, the extending direction of the arm unit 32, as illustrated in FIGS. 1 to 3, may be a vertically upward direction or a direction inclined to the front side (the side on which the medium 6 is disposed) or the back side (a side opposite to the side on which the medium 6 is disposed) from the vertically upward direction.

The top unit 33 is connected to the arm unit 32 and extends from the arm unit 32 so as to face the medium installation face 5. In the first embodiment, as illustrated in FIG. 2, the top unit 33 is connected to an upper end portion of the arm unit 32, extends to the front side at a position of a height at which the arm unit 32 is connected, and extends toward the upward inclination from the horizontal direction.

The base unit 31, the arm unit 32, and the top unit 33 of the lighting device 3 are integrally fixed. In other words, a connection portion between the base unit 31 and the arm unit 32 and a connection portion between the arm unit 32 and the top unit 33 are fixedly disposed so as not to be deformed such as being rotated, detached/attached, or moved.

Figure 4:
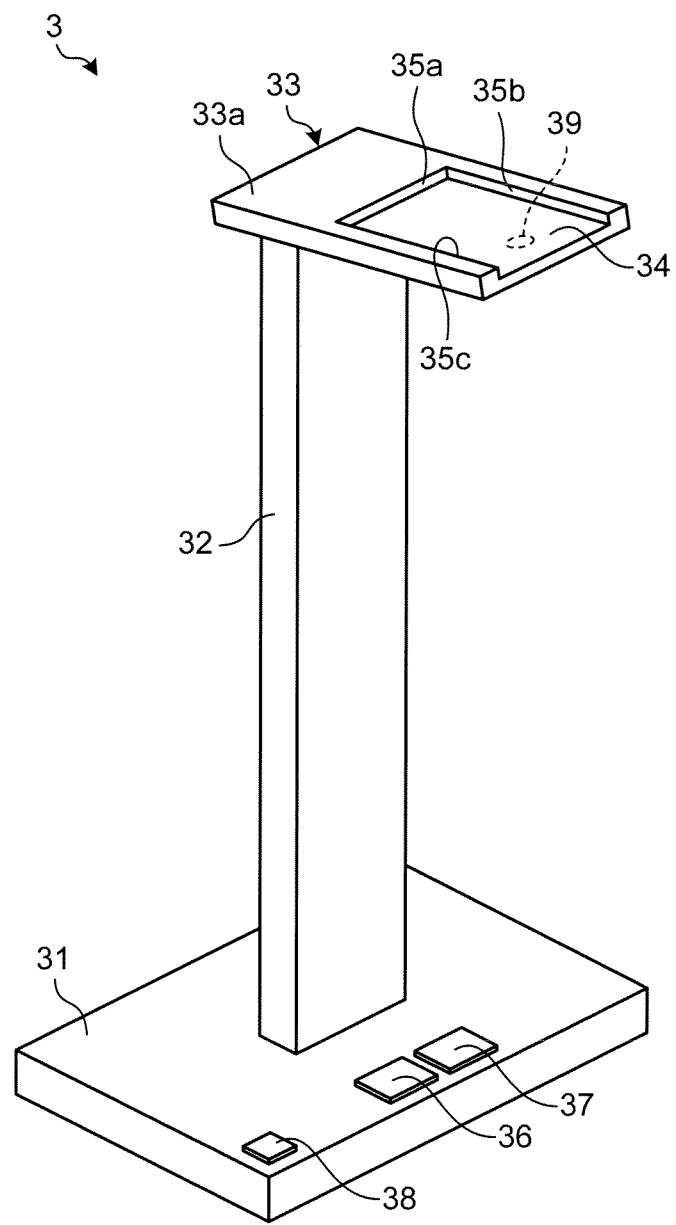
FIG. 4 is a perspective view of a lighting device illustrated in FIG. 1.

FIG. 4 is a perspective view of the lighting device illustrated in FIG. 1. On an upper face 33a of the top unit 33 of the lighting device 3, a mounting face 34 which is used for mounting the smartphone 2 is disposed at a position where the smartphone 2 can photograph the medium 6 disposed on the medium installation face 5.

The mounting face 34 is formed by being recessed from the upper face 33a of the top unit 33. The placement surface 34a is formed 33a. The mounting face 34 is disposed such that a part of rear face of the smartphone 2 in the longitudinal direction thereof protrudes from the distal end of the top unit 33 when the smartphone 2 is mounted. In other words, the mounting face 34 is formed from the front end of the top unit 33 over the rear side (the direction of the arm unit 32) thereof, and the area of the mounting face 34 is smaller than the area of the rear face of the smartphone 2. In addition, the length of the mounting face 34 in the front/back direction is shorter than the length of the smartphone 2 in the longitudinal direction. Accordingly, the smartphone 2 can be mounted on the mounting face 34 with the image capturing unit 21 disposed on the rear face of the smartphone 2 not being hidden by the mounting face 34. In other words, when the smartphone 2 is mounted on the mounting face 34, the image capturing unit 21 is positioned so as to directly face the medium installation face 5, and accordingly, the image capturing unit 21 can image the medium 6 disposed on the medium installation face 5. In addition, by forming the mounting face 34 as such, smooth mounting and dismounting of the smartphone 2 is available.

Between the upper face 33a of the top unit 33 and the mounting face 34, steps or steps are formed. More specifically, a step 35a which is brought into contact with the lower portion of the smartphone 2 in the longitudinal direction and steps 35b and 35c which are brought into contact with right and left side faces of the smartphone 2. Namely, the steps 35a, 35b, and 35c are provided so as to abut the smartphone 2 from three directions. The steps 35a and 35b are connected at an approximately right angle, the steps 35a and 35c are connected at an approximately right angle, and the steps 35b and 35c are arranged in parallel with the front/back direction. By bringing such steps 35a, 35b, and 35c into contact with the smartphone 2, the position of the smartphone 2 can be determined to be a predetermined position. In other words, the steps 35a, 35b, and 35c formed between the upper face 33a of the top unit 33 and the mounting face 34 serve as a positioning unit which is used for positioning the smartphone 2 at a predetermined position on the mounting face 34.

Thus, when the smartphone 2 is mounted on the mounting face 34, by only causing the lower portion of the smartphone 2 in the longitudinal direction to abut against the step 35a, the smartphone 2 can be mounted by being easily positioned at a predetermined position on the mounting face 34. In addition, as described above, since the top unit 33 is inclined, the mounting face 34 is disposed to be inclined in the downward direction with respect to the horizontal direction from the front side to the rear side of the top unit 33. Accordingly, it is easy to cause the smartphone 2 to abut against the step 35a.

The installation position of the mounting face 34 is set such that there is a distance between the image capturing unit 21 of the smartphone 2 and the medium installation face 5 to some degree for which the entirety of a predetermined photographed area 7 disposed on the lower side can be imaged when the smartphone 2 is mounted on the mounting face 34. Described in more detail, the mounting face 34 is configured such that, when the smartphone 2 is mounted on the mounting face 34, the photographed area 7 of the smartphone 2 includes an area in which the medium 6, which neighbors to the front side of the base unit 31 of the lighting device 3, is arranged and a front-side upper face portion of the base unit 31.

In addition, on the upper face of the base unit 31 of the lighting device 3, a scan switch 36, a lighting switch 37, and a power switch 38 are disposed. Furthermore, on the lower face of the top unit 33 of the lighting device 3 which faces the medium installation face 5, a lighting light emitting diode (LED) 39 is disposed. The scan switch 36, the lighting switch 37, the power switch 38, and the lighting LED 39 are electrically connected to a control unit 40 (see FIG. 5) which is equipped inside the lighting device 3. Such switches may be disposed at positions other than on the top face of the base unit 31. For example, the power switch 38 may be disposed on the rear face of the base unit 31. In addition, instead of disposing the power switch 38 in the lighting device 3, the lighting device 3 may be turned on/off by plugging or unplugging a plug-in plug included in the lighting device 3 into a plug socket.

The scan switch 36 is an input unit which receives an instruction of a scan manipulation which causes the smartphone 2 to perform a scanning operation from the user. In addition, the lighting switch 37 is an input unit which is used for switching over On and Off of the lighting LED 39 and for adjusting the amount of light emitted from the lighting LED 39. In addition, the power switch 38 is a switch which switches over conduction and non-conduction between an external power supply 50 (see FIG. 5) and the lighting device 3. In addition, the lighting LED 39 is arranged on the lower face of the top unit 33 such that an emission range 8 at the time of emission is substantially the same as the photographed area 7 of the smartphone 2, and the photographed area 7 can be evenly lighted.

Figure 5:
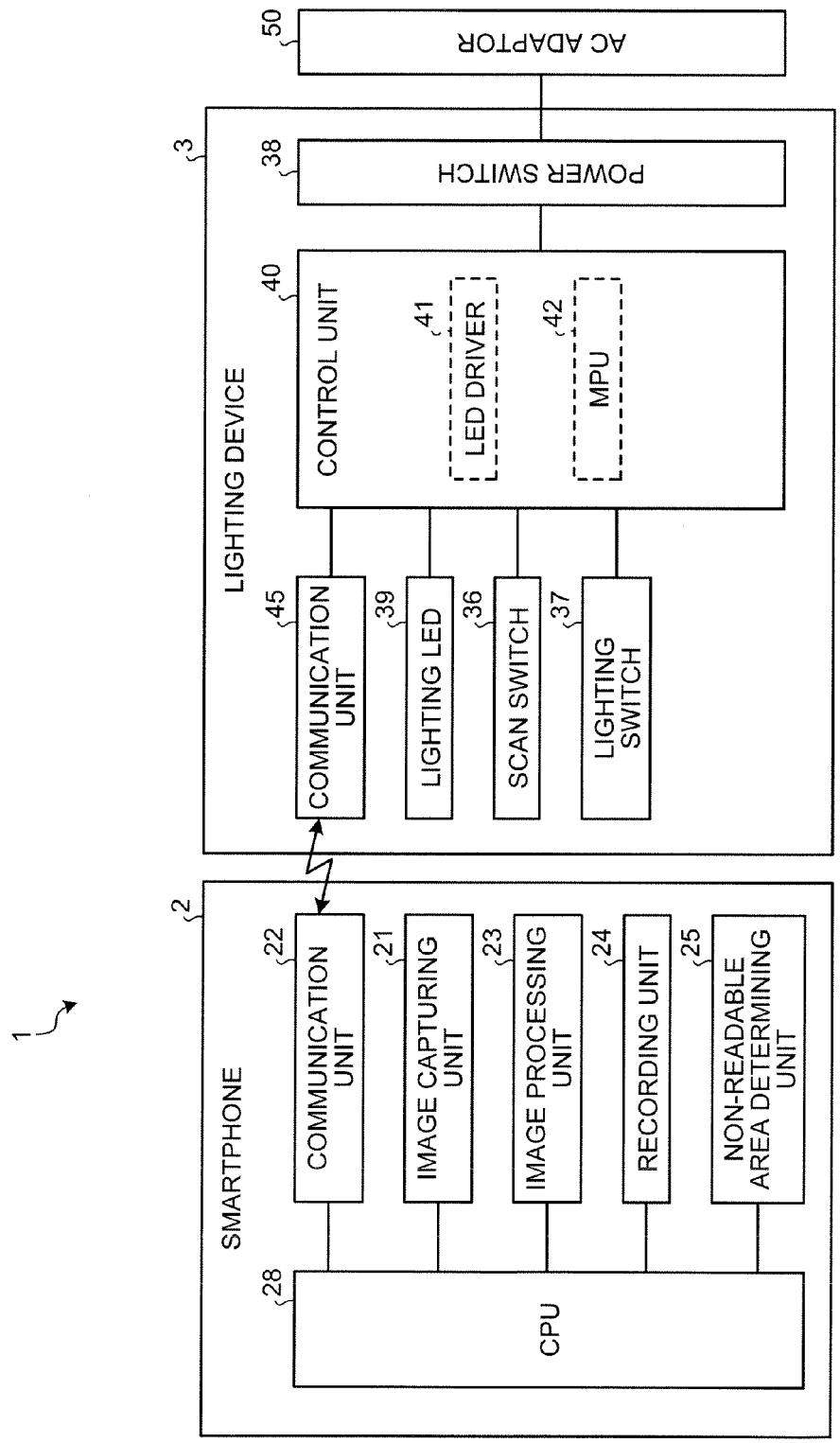
FIG. 5 is a functional block diagram of the image capturing system illustrated in FIG. 1.

FIG. 5 is a functional block diagram of the image capturing system illustrated in FIG. 1. The smartphone 2 configuring the image capturing system 1 together with the lighting device 3 is equipped with the image capturing unit 21, a communication unit 22, an image processing unit 23, a recording unit 24, a non-readable area determining unit 25, and the central processing unit (CPU) 28. The image capturing unit 21, the communication unit 22, the image processing unit 23, the recording unit 24, and the non-readable area determining unit 25 are electrically connected to the CPU 28.

The communication unit 22 is configured to be capable of communicating with the lighting device 3 and, for example, performs wireless communication using the Bluetooth (registered trademark). The communication with the lighting device 3 may be performed using a technique other than the Bluetooth, and any technique such as the near field communication (NFC) or the infrared communication which is capable of performing communication between the smartphone 2 mounted on the mounting face 34 and the lighting device 3 may be used.

The image processing unit 23 is a part which performs arbitrary image processing for an image captured by the image capturing unit 21. The image processing unit 23, for example, performs image processing for the image of the medium 6 which is captured by the image capturing unit 21 of the smartphone 2 mounted on the inclined mounting face 34 of the top unit 33 from the upper side of the inclination of the medium 6 disposed on the medium installation face 5 to be an image acquired by photographing the medium 6 from the upper side in the vertical direction. The recording unit 24 is a storage device which stores read data acquired by the image capturing unit 21 and image data acquired by performing image processing using the image processing unit 23.

The non-readable area determining unit 25 determines whether or not there is a non-readable area from which information of the medium 6 cannot be read by the smartphone 2 due to reflected light of the lighting LED 39 which is reflected on the medium 6. Described in more detail, in a case where the medium 6 which is an object is formed to have a high degree of smoothness of the surface and to have a gloss in the surface, when the medium 6 is irradiated with emission light emitted from the lighting LED 39, there are cases where the emission light is specularly reflected on the surface of the medium 6. In a case where the reflected light which has been specularly reflected travels toward the image capturing unit 21 of the smartphone 2 and is incident to the image capturing unit 21, at a portion of the medium 6 where the reflected light is reflecting, the luminance level becomes too high for the smartphone 2 to read information of the portion of the medium 6, due to the reflected light. In other words, in a case where the emission light emitted from the lighting LED 39 is specularly reflected on the surface of the medium 6, there are cases where a non-readable area at which information of the medium 6 cannot be read by the smartphone 2 may be generated on the medium 6 due to the reflected light. The non-readable area determining unit 25, before storing the image data of the medium 6 captured by the smartphone 2, determines whether or not there is a non-readable area based on an image corresponding to the medium 6 which is acquired by photographing in the turned-on state of the lighting LED 39.

The CPU 28 performs various calculation processes at the time of communication with the lighting device 3 in the communication unit 22, at the time of a photographing process performed by the image capturing unit 21, at the time of image processing performed by the image processing unit 23, at the time of determining whether or not there is a non-readable area in the non-readable area determining unit 25, and the like.

On the other hand, the lighting device 3 is equipped with a communication unit 45, the lighting LED 39, the scan switch 36, the lighting switch 37, the power switch 38, and the control unit 40. The communication unit 45, the lighting LED 39, the scan switch 36, the lighting switch 37, and the power switch 38 are electrically connected to the control unit 40.

The communication unit 45 is configured to be capable of communicating with the communication unit 22 of the smartphone 2 using the Bluetooth or the like. The smartphone 2 and the lighting device 3 can communicate with each other through wireless communication using the communication units 22 and 45 thereof.

The control unit 40 includes an LED driver 41 and a micro processing unit (MPU) 42. Of these, the LED driver 41 is configured to cause the lighting LED 39 to emit light by adjusting power supplied to the lighting LED 39. Accordingly, the control unit 40 including the LED driver 41 is arranged also as a lighting control unit which performs driving control of the lighting LED 39. In addition, the MPU 42 is arranged to perform light emission control of the lighting LED 39 and control of the communication between the lighting device 3 and the smartphone 2 by transmitting a control signal to the LED driver 41 or the communication unit 45 in accordance with an input manipulation of the scan switch 36 or the lighting switch 37.

The power switch 38 is interposed between the AC adaptor 50 connected to an external power supply and the control unit 40 and can perform switching over the operation and the stop of the lighting device 3 by performing switching over conduction (On) and non-conduction (Off) between the control unit 40 and the external power supply in accordance with an input manipulation.

The image capturing system 1 according to the first embodiment is configured as described above, and, hereinafter, the operation thereof will be described. Generally, the lighting device 3 configuring the image capturing system 1 is used in a lighting stand. When the lighting device 3 is used as a lighting stand, an input manipulation such as a depressing operation is performed for the lighting switch 37 with the power switch 38 being in the On state. An input to this lighting switch 37 may be other than a strong depression and thus may be a tap on the lighting switch 37 or a contact (touch) with the lighting switch 37 according to the form of the lighting switch 37. The MPU 42 which has detected a depression on the lighting switch 37 turns on the lighting LED 39 through the LED driver 41. Accordingly, the lighting LED 39 emits light for the emission range 8, and the lighting device 3 can light the lower side of the top unit 33 using the light emitted from the lighting LED 39. When the lighting LED 39 which is in the turn-on state is turned off, an input manipulation such as a depressing operation is performed for the lighting switch 37 in the state in which the lighting LED 39 is turned on. As a result, the MPU 42 turns off the lighting LED 39 through the LED driver 41.

In addition, in the image capturing system 1 according to the first embodiment, the lighting device 3 is used not only as a lighting stand, but, by setting the smartphone 2 in the lighting device 3, the medium 6 can be scanned by reading the medium 6 which is installed on the medium installation face 5 by using the smartphone 2. In the scanning of the medium 6, image data is generated by using a method of generating image data according to the first embodiment, whereby the image of the medium 6 is acquired. The scanning of the medium 6 in the image capturing system 1 will be described. When the medium 6 is scanned, the smartphone 2 is mounted on the mounting face 34 of the top unit 33 so as to position the image capturing unit 21 of the smartphone 2 on the lower side in a direction in which the image capturing unit 21 is exposed from the top unit 33.

The smartphone 2 and the lighting device 3 are configured to transmit and receive information thereof by performing communication between the communication unit 22 of the smartphone 2 and the communication unit 45 of the lighting device 3. In addition, the smartphone 2 can perform a photographing operation in accordance with the reception of a control signal which is transmitted from the lighting device 3. In the image capturing system 1, the start of scanning is triggered upon the depression of the scan switch 36. In other words, the turning-on of the scan switch 36 is a trigger for the scanning performed by the image capturing system 1. Accordingly, the smartphone 2 mounted in the top unit 33 of the lighting device 3 continues to wait for the reception of a scan start trigger transmitted from the lighting device 3 in the communication unit 22.

In this state, when the scan switch 36 of the lighting device 3 is depressed by the user, a scan start trigger is transmitted from the lighting device 3 to the smartphone 2. This scan start trigger is transmitted from the communication unit 45 of the lighting device 3 and is received by the communication unit 22 of the smartphone 2. The smartphone 2 which has received the scan start trigger makes a turn-on instruction for the lighting LED 39 included in the lighting device 3. The lighting device 3 which has been instructed to turn on the lighting LED 39 from the smartphone 2 maintains the turned-on state of the lighting LED 39 in a case where the lighting LED 39 is in the turned-on state at the time of receiving the turn-on instruction and turns on the lighting LED 39 in a case where the lighting LED 39 is in the turned-off state at that time.

Figure 6:
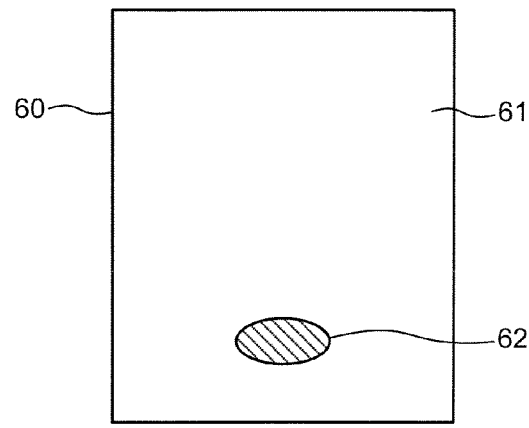

In the state in which the lighting LED 39 is turned on as above, the smartphone 2, before storing the image data of the medium 6, determines whether or not there is a non-readable area based on the image data corresponding to the medium 6 which has been acquired through the photographing process in the turned-on state of the lighting LED 39. FIG. 6 is a schematic diagram illustrating an image which is in a state in which the non-readable area occurs on the medium when the lighting LED is turned on. When the lighting LED 39 is turned on, depending on materials of the medium 6, there are cases where emission light emitted from the lighting LED 39 is specularly reflected on the medium 6, the specularly reflected light is incident to the image capturing unit 21 of the smartphone 2, and accordingly, a non-readable area 62 from which information of the medium 6 cannot be read by the smartphone 2 occurs. The image capturing system 1 determines whether or not the non-readable area 62 occurs based on image data 60 of the photographed area 7 which is constantly photographed by the image capturing unit 21 by using the non-readable area determining unit 25 of the smartphone 2.

In other words, after the scan switch 36 is depressed, the smartphone 2 reads the medium 6 and waits in a state in which the photographed area 7 is constantly photographed by the image capturing unit 21 even before the image data 60 is stored. Accordingly, the non-readable area determining unit 25 determines whether there is the non-readable area 62 based on the image data 60 of the medium 6 which has been acquired by performing the photographing process using the image capturing unit 21. The smartphone 2 changes the process at the time of photographing the medium 6 based on whether or not there is the non-readable area 62.

First, when it is determined that there is no non-readable area 62 in the image data 60, the medium 6 within the photographed area 7 is photographed by capturing an image of the photographed area 7 on the medium installation face 5 by using the image capturing unit 21 in the state in which the lighting LED 39 is turned on, and the image data 60 is stored in the recording unit 24 of the smartphone 2. Accordingly, the image capturing system 1 photographs and stores the medium 6 under an optimal environment created by the lighting LED 39 which is a lighting thereof, thereby scanning the medium 6. When the image data 60 acquired through this scanning process is stored in the recording unit 24, the image data is adjusted to have an appropriate image quality through image processing performed in the image processing unit 23 included in the smartphone 2 and is stored by being recorded in the recording unit 24.

On the other hand, when it is determined that there is the non-readable area 62 on the medium 6 due to light emitted from the lighting LED 39, once, the medium 6 is photographed in the state. In other words, by photographing the medium 6 in the state in which the lighting LED 39 is turned on, the image data 60 of the medium 6 is acquired in the state in which the non-readable area 62 is included in the image data 60. Accordingly, the image data 60 includes the non-readable area 62 from which the information of the medium 6 cannot be read and a readable area 61 from which the information of the medium 6 can be read.

Figure 7:
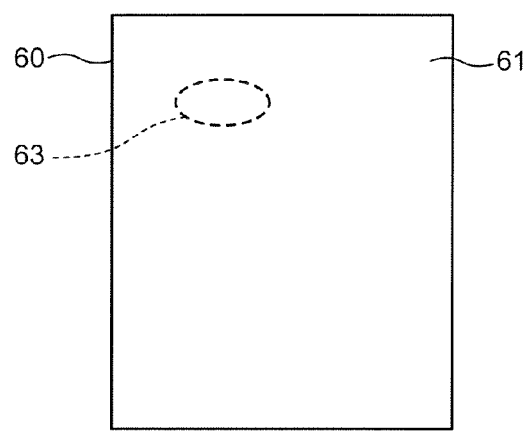
FIG. 7 is a schematic diagram that illustrates an image of the medium when the lighting LED is turned off.

FIG. 7 is a schematic diagram which illustrates an image of the medium when the lighting LED 39 is turned off. When the image data 60 of the medium 6 including the non-readable area 62 is acquired, the lighting LED 39 is turned off, and the medium 6 is photographed in this state. In the case where the lighting LED 39 is turned off, the medium 6 is not irradiated with emission light emitted from the lighting LED 39. Accordingly, the emission light emitted from the lighting LED 39 is not reflected on the medium 6, and the non-readable area 62 due to the reflection of the emission light emitted from the lighting LED 39 on the medium 6 does not occur.

In addition, in a case where the material of the medium 6 has a material in which the non-readable area 62 due to specular reflection of the emission light emitted from the lighting LED 39 on the medium 6 occurs, there are cases where ambient light is specularly reflected on the medium 6 even in a case where the lighting LED 39 is turned off. For example, there is a case where emission light emitted from an external light 70 (see FIG. 9), such as a fluorescent lamp disposed on the ceiling of a room in which the image capturing system 1 is installed, is specularly reflected on the medium 6, and the reflected light is incident to the image capturing unit 21 of the smartphone 2.

In such a case, since light from the external light 70 is directly reflected on the medium 6 and is incident to the image capturing unit 21, the specularly reflected light has the amount of light which is larger than that of light diffused into and reflected on the other portions of the medium 6, and light also including information of the form of the external light 70 is incident to the image capturing unit 21. Accordingly, in the area in which light from the external light 70 is specularly reflected on the medium 6, a ghost image of the external light 70 is generated, and this area becomes an external-light specular reflection area 63 from which the information of the medium 6 is more difficult to read than the other areas. Accordingly, in the image data 60 of the medium 6, the external-light specular reflection area 63 appears as an area from which the information of the medium 6 is more difficult to read than the readable area 61 on the periphery thereof.

When the image data 60 of the medium 6 including the non-readable area 62 is acquired, the image capturing system 1 photographs the medium 6 in the state in which the lighting LED 39 is turned off, regardless whether there is the external-light specular reflection area 63 when the lighting LED 39 is turned off, and acquires the image data 60 at the time when the lighting LED 39 is turned off.

Figure 8:
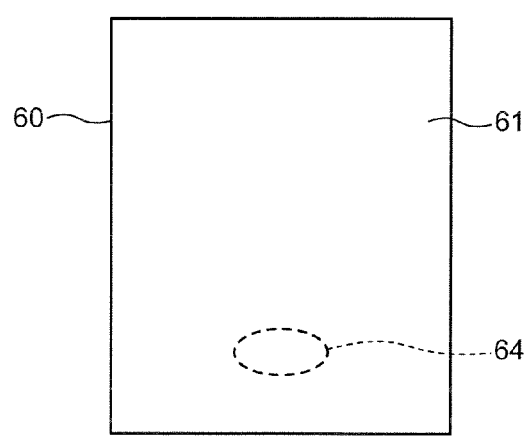
FIG. 8 is a schematic diagram that illustrates an image acquired by synthesizing the image acquired when the lighting LED is turned on and the image acquired when the lighting LED is turned off.

FIG. 8 is a schematic diagram which illustrates an image acquired by synthesizing the image acquired when the lighting LED 39 is turned on and the image acquired when the lighting LED 39 is turned off. When the image data 60 in the state in which the lighting LED 39 is turned on and the image data 60 in the state in which the lighting LED 39 is turned off are acquired, the image capturing system 1 synthesizes the image data of both the states. More specifically, the portion of the image data 60 acquired when the lighting LED 39 is turned on that corresponds to the non-readable area 62 is replaced with a portion of the image data 60 acquired when the lighting LED 39 is turned off that corresponds to the non-readable area 62 of the image data 60 acquired when the lighting LED 39 is turned on.

In other words, among the image data 60 (see FIG. 7) acquired when the lighting LED 39 is turned off, a portion which corresponds to the non-readable area 62 (see FIG. 6) of the image data 60 acquired when the lighting LED 39 is turned on is set as a replacement area 64, and the non-readable area 62 of the image data 60 acquired when the lighting LED 39 is turned on is replaced with the replacement area 64. Since the replacement area 64 is positioned in the readable area 61 in the image data 60 acquired when the lighting LED 39 is turned off, information of the medium 6 can be read from the replacement area 64. Accordingly, the entire area of the image data 60 acquired by replacing the non-readable area 62 with the replacement area 64 is the readable area 61, and therefore, information of the entire area of the medium 6 can be read.

In a case where it is determined that there is the non-readable area 62 when the lighting LED 39 is turned on, the image capturing system 1 changes the lighting state by differently setting the turned-on state of the lighting LED 39 as above and photographs the medium 6 using the smartphone 2 in each state in which the lighting state is changed. In addition, among the image data 60 generated in correspondence with each photographing time, readable areas 61 which are areas acquired by excluding an area corresponding to the non-readable area 62 are synthesized, whereby image data 60 which corresponds to the medium 6 is generated.

In addition, when the lighting LED 39 is turned off, the external-light specular reflection area 63 from which the information of the medium 6 is difficult to read is generated, and the amount of light from the external light 70 at the position of the medium 6 is smaller than the amount of light emitted from the lighting LED 39 of a case where the lighting LED 39 is turned on. Accordingly, when the lighting LED 39 is turned on, the external-light specular reflection area 63 is irradiated with light emitted from the lighting LED 39 which has the amount of light which is larger than that of light from the external light 70, and accordingly, the ghost image of the external light 70 becomes less visible. Therefore, the external-light specular reflection area 63 when the lighting LED 39 is turned off becomes the readable area 61 from which information of the medium 6 can be read when the lighting LED 39 is turned on.

Figure 9:
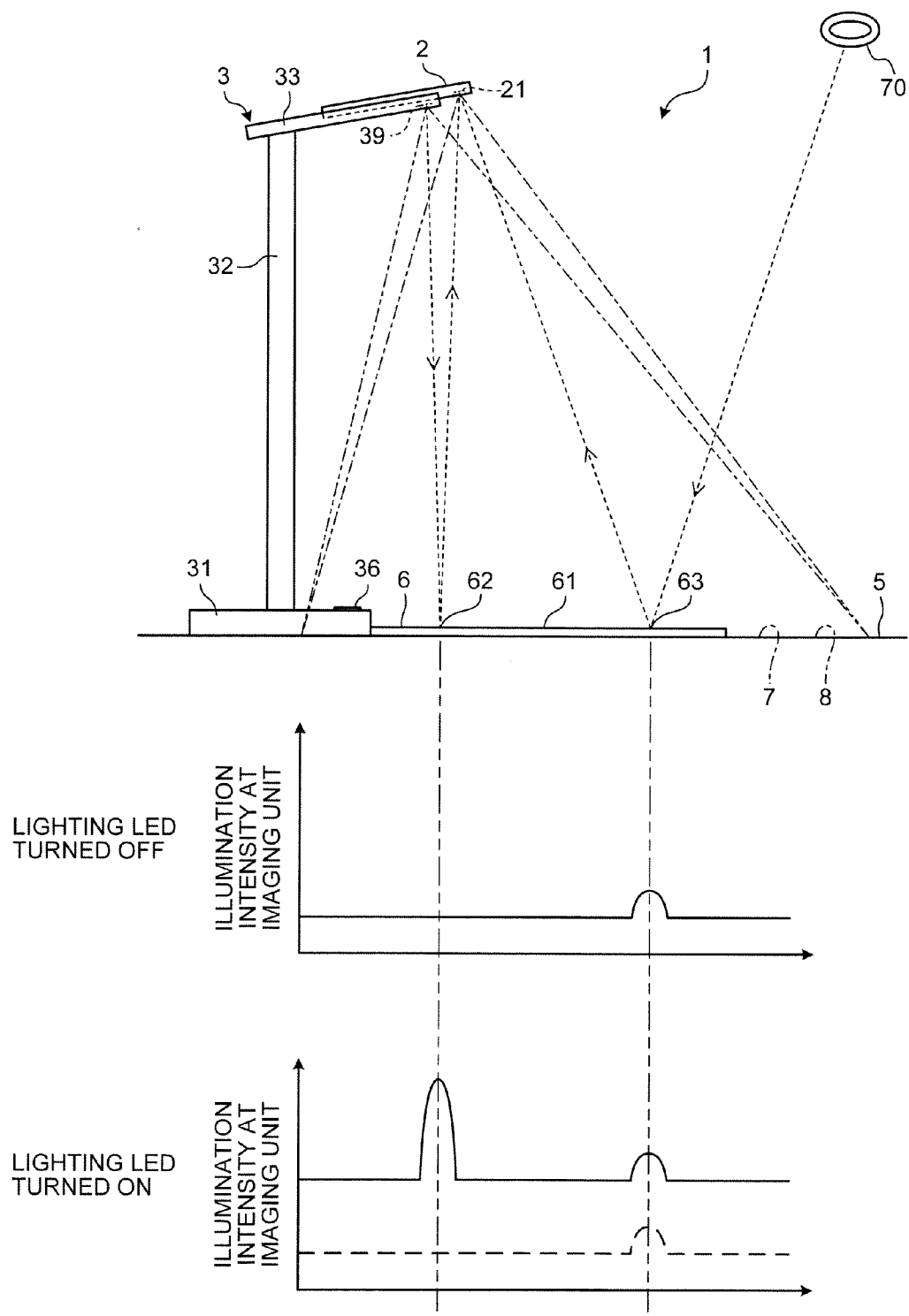
FIG. 9 is a schematic diagram that illustrates dimmer control performed by an image capturing unit when the lighting LED is turned on and turned off.

Next, the reason why the non-readable area 62 and the external-light specular reflection area 63 are generated due to specular reflection of light emitted from the lighting LED 39 and the external light 70 on the surface of the medium 6 will be described. FIG. 9 is a schematic diagram which illustrates illumination intensity at the image capturing unit when the lighting LED is turned on and when the lighting LED is turned off. The smartphone 2 photographs the object by converting light incident to the image capturing unit 21 into an electric signal. Accordingly, when the smartphone 2 photographs the medium 6, the photographing process is performed by receiving light reflected on the surface of the medium 6. Here, generally, when light is emitted to the object, in many cases, diffuse reflection occurs and the image capturing unit 21 photographs the object such as the medium 6 by receiving light of the diffuse reflection as information of the object.

However, in a case where the degree of smoothness of the surface of the medium 6 is high and the surface has a gloss, a part of the light which arrives at the medium 6 is specularly reflected on the surface of the medium 6. Accordingly, when the lighting LED 39 is turned off, in a case where the medium 6 is irradiated with light emitted from the external light 70, light from the medium 6 is specularly reflected as well. Based on the positional relation between the external light 70 and the image capturing unit 21, in a case where the image capturing unit 21 is positioned on the optical path at the time when the light from the external light 70 is specularly reflected, the specularly reflected light is incident to the image capturing unit 21.

While light from the photographed area 7 is received by the image capturing unit 21, the specularly reflected light of the light emitted from the external light 70 has the amount of light which is larger than that of light from the other portions of the photographed area 7, and accordingly, the illumination intensity at the image capturing unit 21, owing to the specularly reflected light of the light emitted from the external light 70, is higher than the illumination intensity of the other portions of the photographed area 7. Therefore, a portion of the medium 6 to which the light emitted from the external light 70 is specularly reflected is the external-light specular reflection area 63 from which the information of the medium 6 is difficult to read.

In addition, in a case where the lighting LED 39 is turned on, the entirety of the photographed area 7 which includes the medium 6 is irradiated with the light emitted from the lighting LED 39, and accordingly, the amount of light emitted to the photographed area 7 is larger than the amount of light at the time when the lighting LED 39 is turned off. Accordingly, the amount of light, which travels toward the image capturing unit 21 after being diffuse-reflected on the object disposed in the photographed area 7, is large, and, therefore, the illumination intensity as a whole at the image capturing unit 21 is higher than that at the time when the lighting LED 39 is turned off.

In addition, at that time, in a case where the medium 6 which specularly reflects the light is installed to the photographed area 7, the light emitted from the lighting LED 39 is specularly reflected on the medium 6 as well. As above, when the light emitted from the lighting LED 39 is specularly reflected on the medium 6, based on the positional relation between the lighting LED 39 and the image capturing unit 21, in a case where the image capturing unit 21 is positioned on the optical path of light which is specularly reflected on the medium 6, the specularly-reflected light is incident to the image capturing unit 21.

At that time, since the distance between the lighting LED 39 and the medium 6 is much shorter than the distance between the external light 70 and the medium 6, the amount of the light emitted from the lighting LED 39 received by the medium 6 is much larger than that of light emitted from the external light 70. Accordingly, the illumination intensity at the image capturing unit 21, when the light emitted from the lighting LED 39 is specularly reflected on the medium 6, and this specularly reflected light is incident to the image capturing unit 21, is much higher than the illumination intensity at the image capturing unit 21 when the light emitted from the external light 70 is specularly reflected on the medium 6.

In addition, the illumination intensity at the image capturing unit 21, when the light emitted from the lighting LED 39 is specularly reflected on the medium 6, is much higher than the illumination intensity of the photographed area 7 when light diffused and reflected on the other portions is incident to the image capturing unit 21. Accordingly, the portion of the medium 6 where the light emitted from the lighting LED 39 is specularly reflected is the non-readable area 62 having illumination intensity too high for the image capturing unit to read the information of the medium 6.

Accordingly, in a case where surface of the medium 6 to be photographed is formed to have a high degree of smoothness and have a gloss on the surface thereof, the non-readable area 62 and the external-light specular reflection area 63 are generated in the image data 60. In the image capturing system 1 according to the first embodiment, in a case where such areas are generated in the image data 60, the image data 60 of the medium 6 is acquired when the lighting LED 39 is turned on and turned off, and such image data 60 is synthesized. Next, a change in the image data 60 before and after the synthesis will be described.

Figure 10:
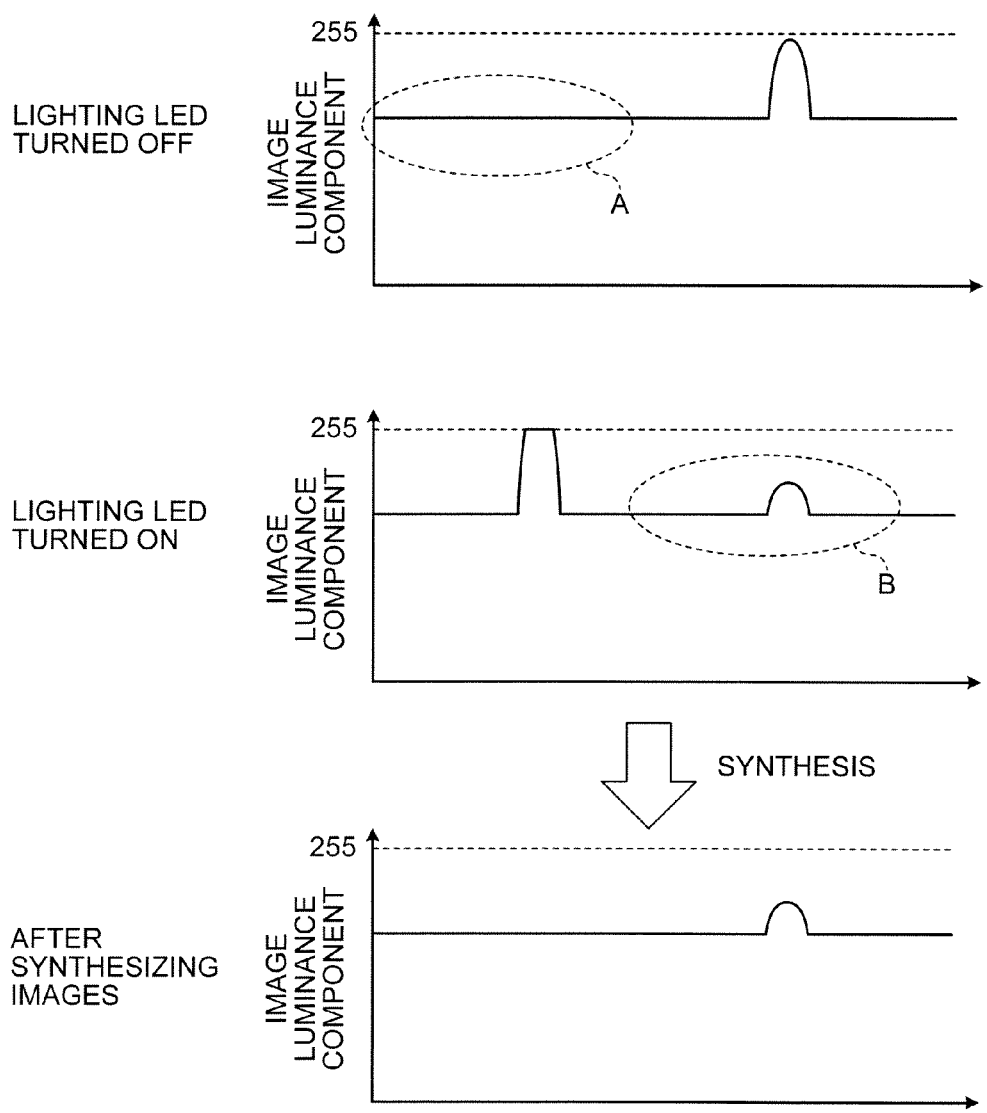
FIG. 10 is a schematic diagram that illustrates a synthesizing technique used for synthesizing image data acquired when the lighting LED is turned on and image data acquired when the lighting LED is turned off.

FIG. 10 is a schematic diagram which illustrates a synthesizing technique used for synthesizing image data acquired when the lighting LED is turned on and image data acquired when the lighting LED is turned off. In a case where the medium 6, which is the object to be photographed, is formed in a form which specularly reflecting the light, an image having a defect due to specular reflection removed can be acquired by synthesizing the image data 60 acquired when the lighting LED 39 is turned on and the image data 60 acquired when the lighting LED 39 is turned off. When the image data 60 is synthesized, in order to facilitate determining the states of the image data 60, first, the image data is digitized. As an example of the digitization, when the image data 60 is converted into YCbCr by using YCbCr which represents the image information using the luminance and the hue, the image luminance component (Y) can be represented in a number in the range of 0 to 255.

When the photographing process is performed by the image capturing unit 21, the exposure and the like are adjusted in accordance with the illumination intensity of a case where the photographed area 7 is seen as a whole. Accordingly, when the image data 60 is converted into YCbCr, the image luminance component at the time when the lighting LED 39 is turned off is within an appropriate range of 0 to 255 in portions other than the external-light specular reflection area 63. On the other hand, the luminance level of a portion, which corresponds to the external-light specular reflection area 63, is higher than that of the other portions, and accordingly, the image luminance component is infinitely close to 255. Therefore, in the external-light specular reflection area 63, it is difficult to read the information of the medium 6 due to a high luminance level.

In addition, the image luminance component in portions other than the non-readable area 62 is within an appropriate range of 0 to 255 at the time when the lighting LED 39 is turned on. On the other hand, the luminance level of the portion corresponding to the non-readable area 62 is much higher than that of the other portions, and accordingly, the image luminance component is in a state exceeding 255, whereby the image luminance component is in a saturated state. Therefore, the luminance level of the non-readable area 62 is too high, and the information of the medium 6 cannot be read therefrom.

Furthermore, when the lighting LED 39 is turned on, the illumination intensity of the entirety of the photographed area 7 is high, and the amount of light which is incident to the image capturing unit is limited by the image capturing unit 21, whereby the amount of incident light from the portion which becomes the external-light specular reflection area 63 when the lighting LED 39 is turned off decreases. Accordingly, the luminance level of the portion which becomes the external-light specular reflection area 63 when the lighting LED 39 is turned off becomes close to the luminance level of the other portions, which facilitates reading the information of the medium 6.

When the image data 60 at the time when the lighting LED 39 is turned off and the image data 60 at the time when the lighting LED 39 is turned on are synthesized together, a portion (portion A in FIG. 10), which corresponds to the non-readable area 62 when the lighting LED 39 is turned on, in the image data 60 when the lighting LED 39 is turned off and a portion (portion B in FIG. 10) which corresponds to the readable area 61 when the lighting LED 39 is turned on are also synthesized. Accordingly, in the image data 60 after the synthesis, the luminance levels in all the areas are within an appropriate range of 0 to 255.

Figure 11:
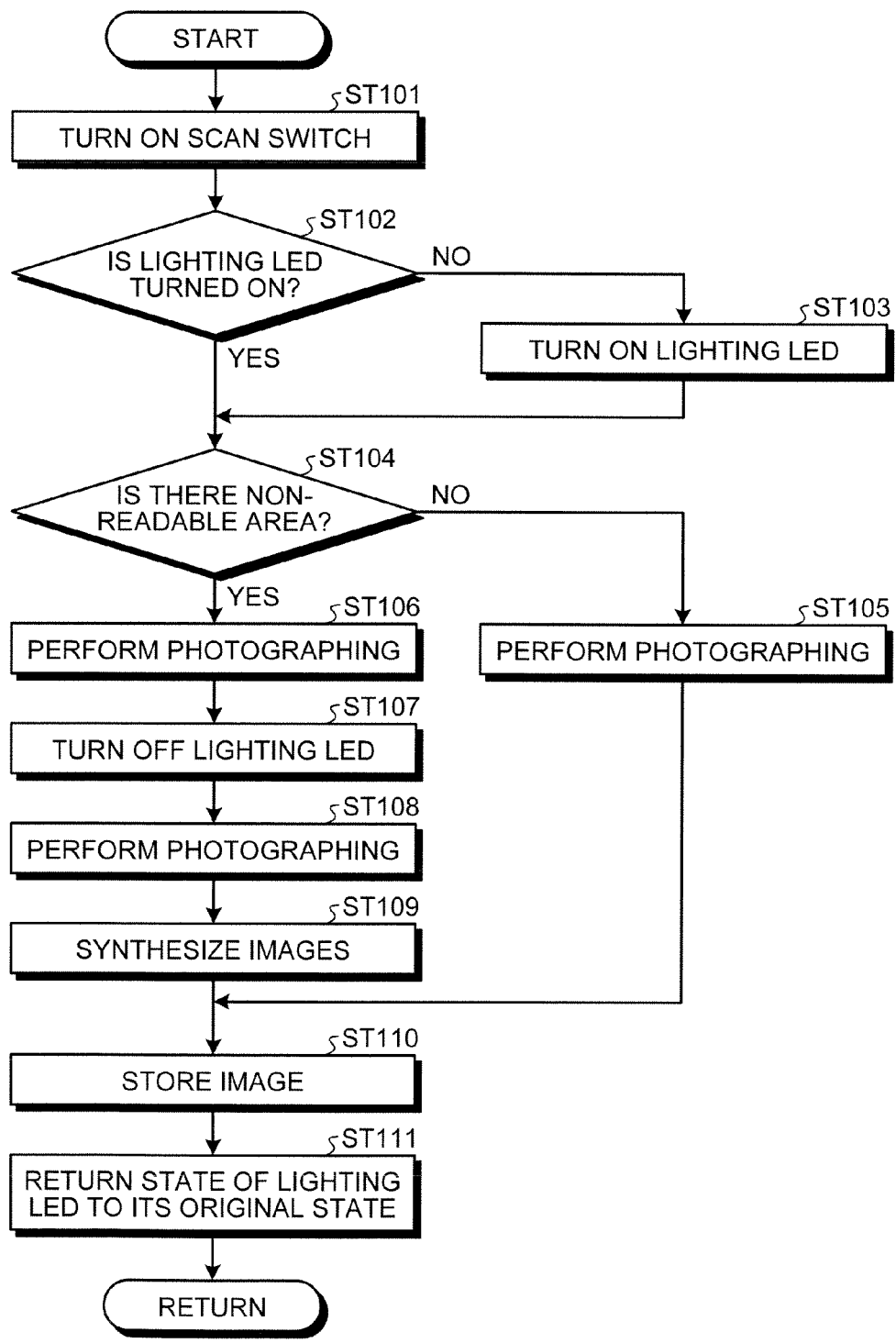
FIG. 11 is a flowchart that illustrates a control sequence at the time of scanning a medium in the image capturing system illustrated in FIG. 1.

Next, the control sequence of the image capturing system 1 which scans the medium 6 by synthesizing the image data 60 acquired when the lighting LED 39 is turned off and the image data acquired when the lighting LED 39 is turned on as above will be described. FIG. 11 is a flowchart which illustrates a control sequence at the time of scanning a medium in the image capturing system illustrated in FIG. 1. When the medium 6 is scanned by the image capturing system 1, the scan switch 36 is turned on by depressing the scan switch 36 in the state in which the power switch 38 is turned on in Step ST101. The state of the scan switch 36 is acquired by the control unit 40. When the scan switch 36 is recognized to be turned on by the control unit 40, by performing communication between the communication unit 45 of the lighting device 3 and the communication unit 22 of the smartphone 2, a scan start instruction is transmitted from the lighting device 3 to the smartphone 2. The smartphone 2 which has received the scan start instruction starts the photographing process by operating the image capturing unit 21.

In addition, when the scan switch 36 is turned on, the lighting device 3 determines whether or not the lighting LED 39 is turned on in Step ST102. Since the turned-on/off state of the lighting LED 39 is controlled by the LED driver 41 of the control unit 40, the control unit 40 determines whether or not the lighting LED 39 is turned on based on the control state of the lighting LED 39 in the LED driver 41.

According to this determination, in a case where it is determined that the lighting LED 39 is not turned on (No in Step ST102), the lighting LED 39 is turned on in Step ST103. In other words, by controlling the lighting LED 39 using the LED driver 41 of the control unit 40, the lighting LED 39 which has been in the turned off state is turned on.

On the other hand, in a case where it is determined that the lighting LED 39 is turned on (Yes in Step ST102), it is determined whether or not there is the non-readable area 62 in Step ST104. In other words, it is determined whether there is the non-readable area 62 based on the image data 60 acquired by the smartphone 2 which has started the photographing process. The determination on whether there is the non-readable area 62 is made by the non-readable area determining unit 25 of the smartphone 2.

Figure 12:
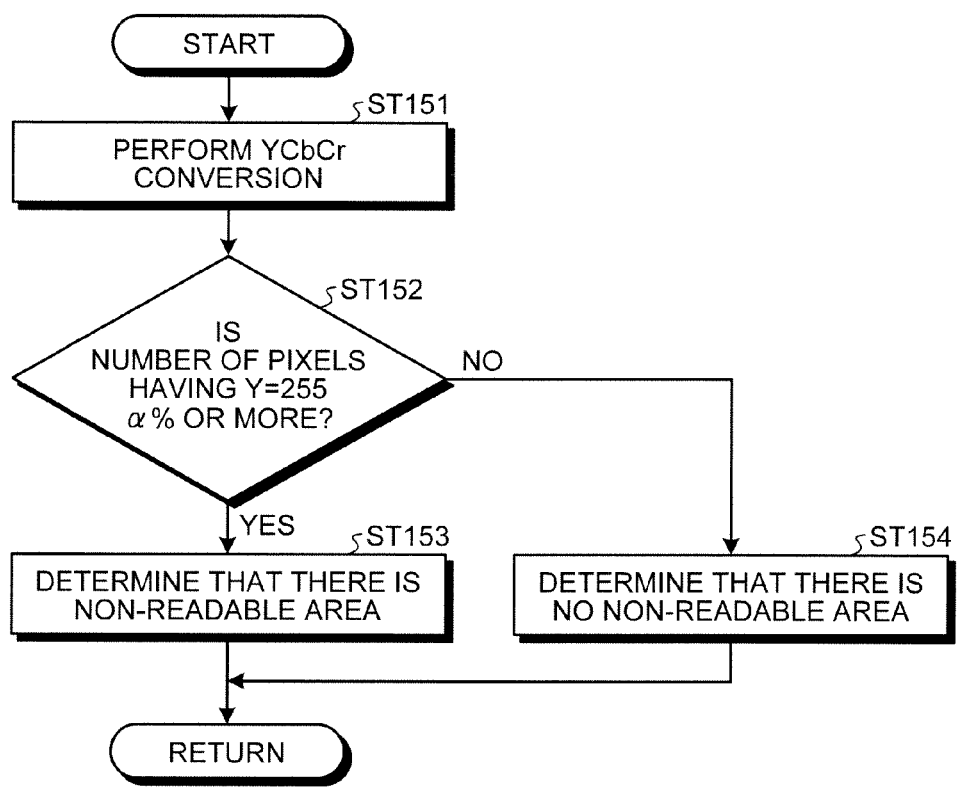
FIG. 12 is a flowchart that illustrates a sequence at the time of determining whether or not there is a non-readable area.

FIG. 12 is a flowchart which illustrates the sequence at the time of determining whether or not there is a non-readable area. As an example of determining whether or not there is the non-readable area 62 at the non-readable area determining unit 25, the sequence of a case where the determination is made by converting the image data 60 into YCbCr will be described. In a case where a determination on whether there is the non-readable area 62 is made, the image data 60, which is acquired by performing the photographing process using the image capturing unit 21, is converted into YCbCr in Step ST151. The non-readable area determining unit 25 determines whether or not there is an area in which the number of pixels having Y=255 is α% or more within a predetermined pixel area in Step ST152.

In other words, it is determined whether or not there is an area in which the number of pixels having Y=255 out of Y (luminance) component, Cb (blue system hue) component and Cr (red system hue) component, which have been acquired through the conversion, is α% or more in an arbitrary area of the image data 60. The arbitrary area and the threshold value α used for this determination are set in advance and are stored. The non-readable area determining unit 25 detects Y for each pixel included in the image data 60 and determines whether or not there is an area in which the number of pixels having Y=255 is α% or more in an area having an arbitrary size.

According to this determination, in a case where it is determined that there is an area in which the number of pixels having Y=255 is α% or more (Yes in Step ST152), the non-readable area determining unit 25 determines that there is the non-readable area 62 in Step ST153. On the other hand, in a case where it is determined that there is no area in which the number of pixels having Y=255 is α% or more (No in Step ST152), the non-readable area determining unit 25 determines that there is no non-readable area 62 in Step ST154.

More specifically, for the image data 60 which is acquired by performing the photographing process in the state in which the lighting LED 39 is turned on, a binarization process is performed by using a luminance level of Y=255 as a threshold, a labeling process is performed, and the image data 60 which is digitized and labeled is partitioned for every predetermined arbitrary areas. After performing the labeling process, a label (area) of a predetermined number of pixels or more (α% or more) is determined as the non-readable area 62.

According to the determination made by the non-readable area determining unit 25, in a case where it is determined that there is no non-readable area 62 (No in Step ST104), the photographed area 7 is photographed by the smartphone 2 in the state in which the lighting LED 39 is turned on in Step ST105. Accordingly, the medium 6 which is installed to the photographed area 7 is read, and the image data 60 of the medium 6, which is in the state in which the non-readable area 62 is not generated, is read.

On the other hand, in a case where it is determined that there is the non-readable area 62 (Yes in Step ST104), similarly, the photographed area 7 is photographed by the smartphone 2 in the state in which the lighting LED 39 is turned on in Step ST106. Accordingly, first, the image data 60 of the medium 6 which is in the state in which the non-readable area 62 is generated is read.

Subsequently, by controlling the lighting LED 39 using the LED driver 41 of the control unit 40, the lighting LED 39 is turned off in Step ST107. In other words, when the photographing process is performed by the smartphone 2, an instruction for turning off the lighting LED 39 is transmitted from the smartphone 2 to the lighting device 3 through the communication unit 22 of the smartphone 2 and the communication unit 45 of the lighting device 3. The lighting device 3 turns off the lighting LED 39 based on this instruction.

When the lighting LED 39 is turned off, a turn-off completion signal is transmitted from the lighting device 3 to the smartphone 2, and smartphone 2 which has received this signal photographs the photographed area 7 with the lighting LED 39 turned off in Step ST108. Consequently, the smartphone 2 reads the image data 60 of the medium 6 in which the non-readable area 62 is not generated because the lighting LED 39 is turned off.

Next, an image is synthesized in Step ST109. In other words, the image data 60 (Step ST106) which is acquired by performing the photographing process in the state in which the lighting LED 39 is turned on and the image data 60 (Step ST108) which is acquired by performing the photographing process in the state in which the lighting LED 39 is turned off are synthesized by the image processing unit 23 of the smartphone 2. Accordingly, the non-readable area 62 included in the image data 60 acquired by performing the photographing process in the state in which the lighting LED 39 is turned on is replaced with the replacement area 64 which is an area of the same range included in the image data 60 acquired by performing the photographing process in the state in which the lighting LED 39 is turned off.

More specifically, first, the non-readable area 62, which is included in the image data 60 acquired when the lighting LED 39 is turned on, is expanded by a designated amount, and an edge of the area is extracted. Subsequently, the replacement area 64 is extracted by performing edge extraction of the same area from the image data 60 acquired when the lighting LED 39 is turned off, and the non-readable area 62 included in the image data 60 acquired when the lighting LED 39 is turned on is replaced with the replacement area 64. Subsequently, color adjustment of the replacement area 64 is performed such that the colors of edge portions of both areas are the same. Accordingly, a synthesized image, which looks natural, is acquired.

When the images are synthesized, the image after the synthesis is stored in the recording unit 24 of the smartphone 2 in Step ST110. In addition, also in a case where the image of the medium 6 is acquired by photographing the photographed area 7 in Step ST105 after it is determined that there is no non-readable area 62 (No in Step ST104), this image is also stored in the recording unit 24 of the smartphone 2 in Step ST110.

When the image is stored, the lighting LED 39 is returned to its original state in Step ST111. In other words, when the image is stored, the smartphone 2 transmits an image storage completion signal to the lighting device 3. The lighting device 3 which has received this signal maintains the turned-off state in a case where the lighting LED 39 is turned off when the scanning is started and turns on the lighting LED 39 in a case where the lighting LED 39 is turned on when the scanning is started. When the lighting LED 39 is returned to its original state, the process exits from one cycle of the control sequence.

The image capturing system 1 repeats the cycle of the control sequence while communicating with the smartphone 2 and the lighting device 3, thereby operating the smartphone 2 and the lighting device 3 in association with each other. Accordingly, the image capturing system 1 scans the medium 6 which is installed to the medium installation face 5 and stores a resultant image in the smartphone 2.

In a case where it is determined that there is the non-readable area 62 in the image acquired when the lighting LED 39 is turned on before the image data 60 of the medium 6 is stored, the image capturing system 1 according to the first embodiment performs photographing processes in different lighting states of the lighting LED 39 and generates image data 60 by synthesizing readable areas 61 included in the image data 60 acquired in each photographing process. Thus, in a case where the non-readable area 62 is not generated, a normal photographing process is performed, and a resultant image is stored. On the other hand, in a case where the non-readable area 62 is generated due to specular reflection on the medium 6, an image after eliminating the non-readable area 62 can be stored. As a result, a high-quality image can be appropriately acquired.

In addition, by generating the image data 60 by performing photographing processes in mutually-different lighting states of the lighting LED 39 and synthesizing the readable areas 61 included in the image data 60 acquired in the photographing processes, even in a case where the position of the non-readable area 62 changes on the medium 6, an image after eliminating the non-readable area 62 can be stored. For example, since the reflection state for light of a flat medium 6 and that of a curved medium 6 are different from each other, in a case where the non-readable areas 62 are generated on both the media 6, the positions thereof are different from each other. Even in such a case, by generating image data 60 by performing photographing processes with the lighting states of the lighting LED 39 being set to be different from each other and synthesizing the readable areas 61, in any type of the media 6, an image after eliminating the non-readable area 62 can be acquired. As a result, a high-quality image can be acquired regardless of the form of the medium 6.

In addition, when the medium 6 is scanned, the lighting LED 39 is turned on, and accordingly, even in a case where emission light emitted from the external light 70 is specularly reflected on the medium 6, the degree of difficulty in reading the information of the medium 6 due to the specularly reflected light can be lowered. As a result, a high quality image can be acquired more reliably.

Furthermore, in a case where it is determined that there is the non-readable area 62, the medium 6 is photographed in the turned-on state and the turned-off state of the lighting LED 39 so that the amounts of light are different from each other. Accordingly, by photographing the medium 6 in the turned-off state, an image in which the non-readable area 62 is not generated can be reliably acquired. Thus, by replacing the non-readable area 62 included in the image data 60 with the same area included in the image data 60 of the medium 6 in the turned off state, an image in which there is no non-readable area 62 can be acquired. As a result, a high-quality image can be acquired more reliably.

In addition, in the top unit 33 of the lighting device 3, the mounting face 34 used for mounting the smartphone 2 is disposed at a position capable of photographing the medium 6 installed on the medium installation face 5, and accordingly, the smartphone 2 can be used as an image capturing unit. As a result, also in a case where the lighting device 3 including the lighting LED 39 and the smartphone 2 including the image capturing unit 21 are configured as separate devices, by combining both devices, a high-quality image can be appropriately acquired.

Furthermore, after the medium 6 is photographed by the smartphone 2, the control unit 40 returns the lighting state of the lighting LED 39 to the lighting state before the photographing process, and accordingly, the convenience at the time of using the image capturing system 1 as a lighting stand can be improved. As a result, while the convenience as a lighting stand is secured, a high-quality image can be acquired when the medium 6 is photographed.

In addition, according to the method of generating image data of the first embodiment, in a case where it is determined that there is the non-readable area 62 in the image acquired when the lighting LED 39 is turned on before the image data 60 of the medium 6 is stored, photographing processes are performed in the lighting states of the lighting LED 39 different from each other, and image data 60 is generated by synthesizing readable areas 61 included in the image data 60 acquired in each photographing process. Thus, in a case where the non-readable area 62 is not generated, a normal photographing process is performed, and a resultant image is stored. On the other hand, in a case where the non-readable area 62 is generated due to specular reflection on the medium 6, an image after eliminating the non-readable area 62 can be stored. As a result, a high-quality image can be appropriately acquired.

Second Embodiment

While an image capturing system 81 according to a second embodiment has almost the same configuration as that of the image capturing system 1 according to the first embodiment, the image capturing system 81 has a feature of installing a plurality of lightings in a lighting device 83. Since the other configurations are the same as those of the first embodiment, the description thereof will not be presented, and the same reference numerals will be assigned thereto.

Figure 13:
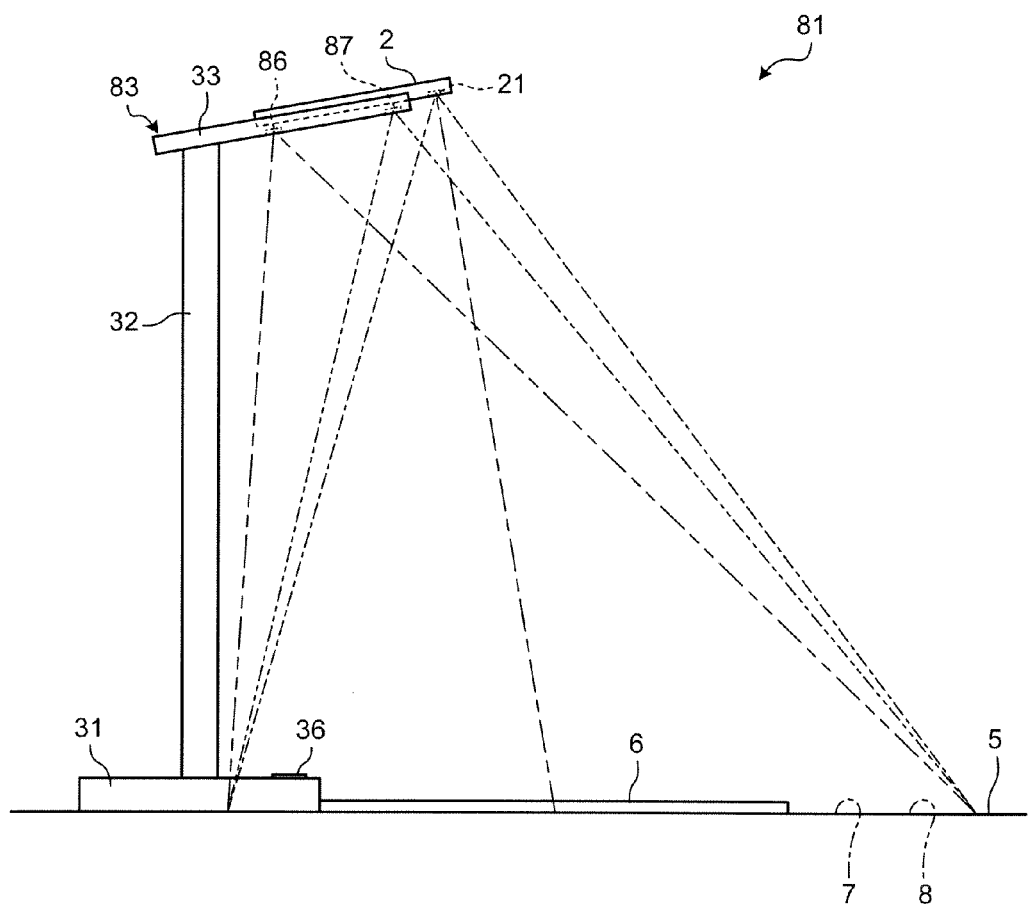
FIG. 13 is a side view of an image capturing system according to a second embodiment.
Figure 14:
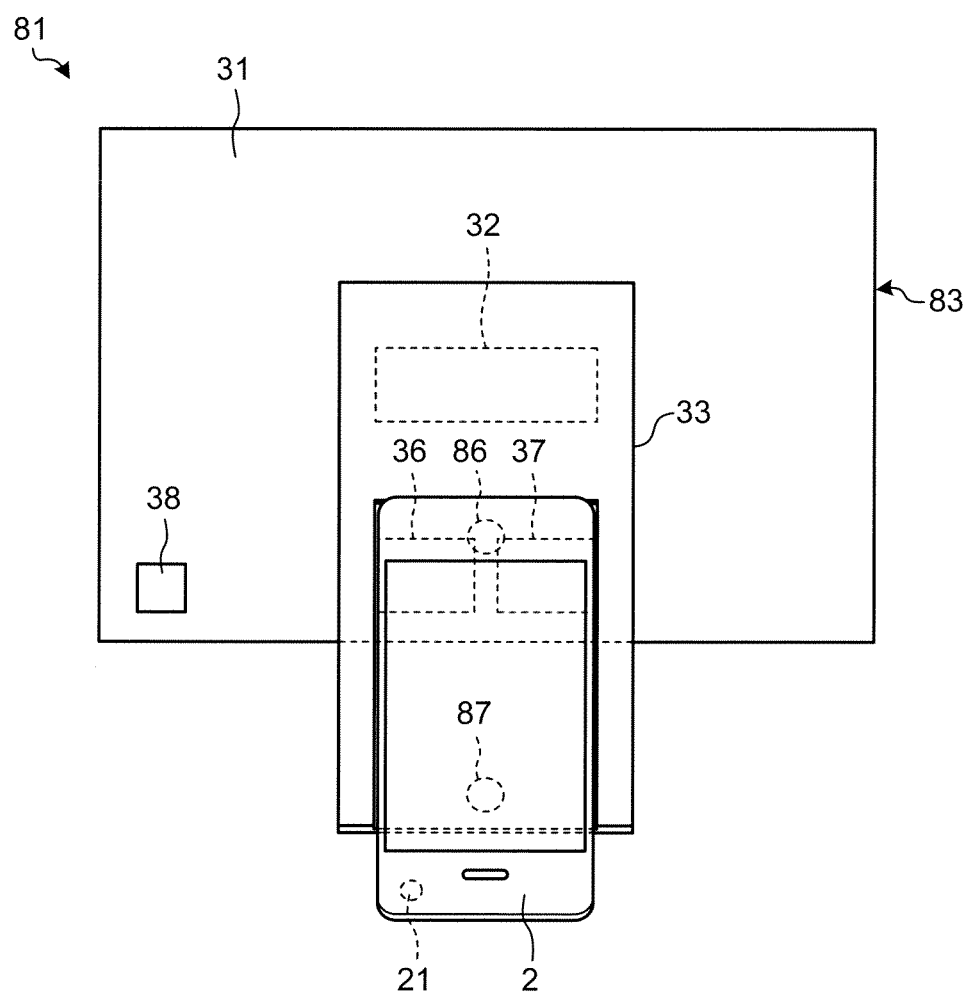
FIG. 14 is a plan view of the image capturing system illustrated in FIG. 13.
Figure 15:
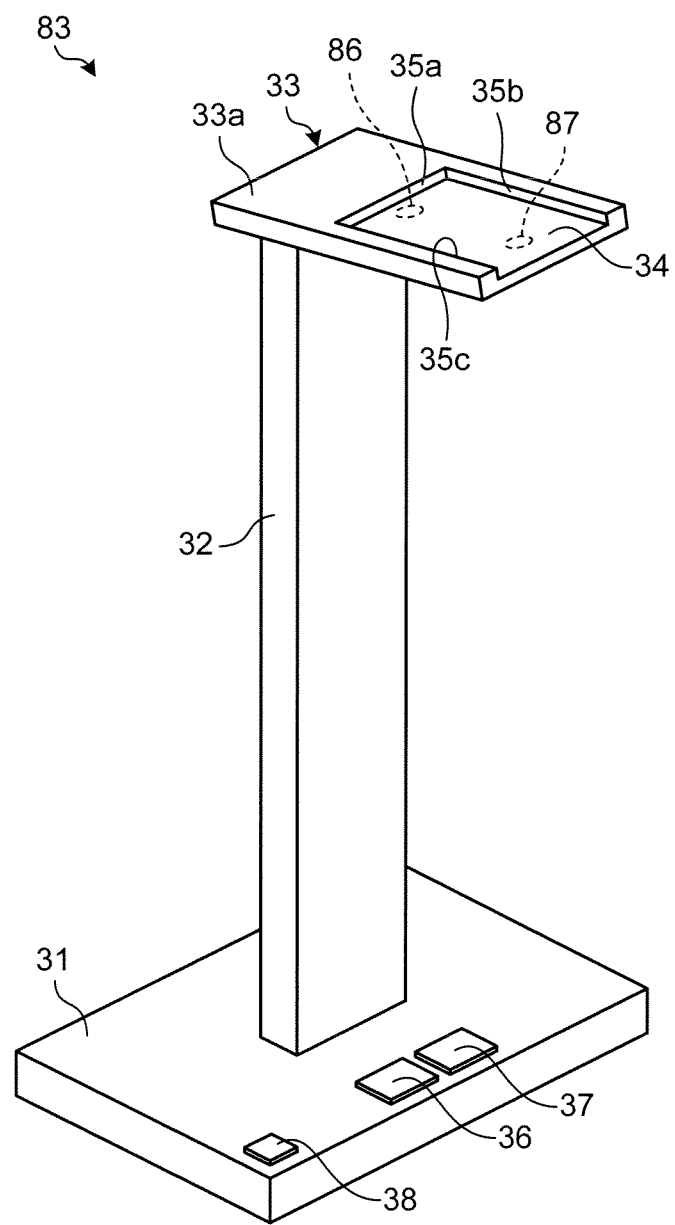
FIG. 15 is a perspective view of a lighting device illustrated in FIG. 13.

FIG. 13 is a side view of the image capturing system according to the second embodiment. FIG. 14 is a plan view of the image capturing system illustrated in FIG. 13. FIG. 15 is a perspective view of a lighting device illustrated in FIG. 13. Similar to the image capturing system 1 according to the first embodiment, the image capturing system 81 according to the second embodiment is equipped with a smartphone 2 and a lighting device 83 which can mount the smartphone 2, and the lighting device 83 includes three members including a base unit 31, an arm unit 32, and a top unit 33. Also in the image capturing system 81 according to the second embodiment, on a lower face of the top unit 33 which faces a medium installation face 5, a lighting which irradiates a medium installation face 5 is disposed, but, different from the first embodiment, this lighting includes a first lighting LED 86 which is a first lighting and a second lighting LED 87 which is a second lighting.

The first lighting LED 86 and the second lighting LED 87 are disposed at mutually different positions on the lower face of the top unit 33. Described in more detail, the first lighting LED 86 is arranged at a position located on the side of the arm unit 32 on the lower face of the top unit 33, and the second lighting LED 87 is arranged at a position located far from the arm unit 32 on the lower face of the top unit 33, in other words, at a position located on the front end side of the lower face of the top unit 33. While the first lighting LED 86 and the second lighting LED 87 are disposed at such mutually different positions, the lighting LEDs are disposed to irradiate the same emission range 8.

Figure 16:
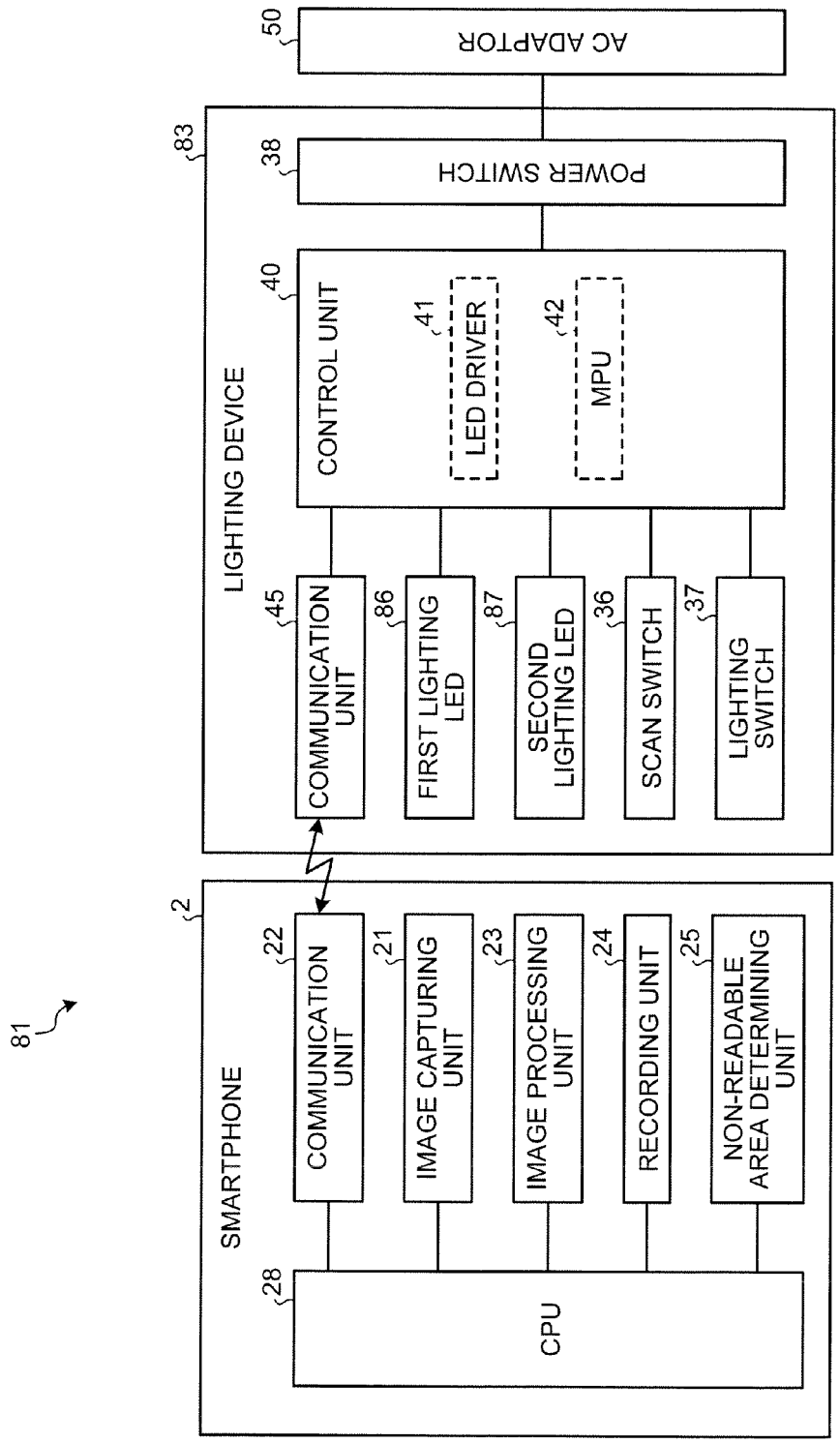
FIG. 16 is a functional block diagram of the image capturing system illustrated in FIG. 13.

FIG. 16 is a functional block diagram of the image capturing system illustrated in FIG. 13. Also in the image capturing system 81 according to the second embodiment, the smartphone 2 is equipped with an image capturing unit 21, a communication unit 22, an image processing unit 23, a recording unit 24, a non-readable area determining unit 25, and a CPU 28. The lighting device 83 is equipped with a communication unit 45, a scan switch 36, a lighting switch 37, a power switch 38, and a control unit 40, and an AC adaptor 50 connected to an external power supply is connected to the power switch 38.

In addition, both the first and second lighting LEDs 86 and 87 included in the lighting device 83 are electrically connected to the control unit 40. An LED driver 41 included in the control unit 40 is configured to cause the first and second lighting LEDs 86 and 87 to emit light by adjusting power supplied to the first and second lighting LEDs 86 and 87. At that time, the LED driver 41 is configured to be able to independently turn on or turn off the first lighting LED 86 and the second lighting LED 87.

The image capturing system 81 according to the second embodiment is configured as described above, and, hereinafter, the operation thereof will be described. Similar to the lighting device 3 of the image capturing system 1 according to the first embodiment, the lighting device 83 configuring the image capturing system 81 can be normally used as a lighting stand. When the lighting device 83 is used as a lighting stand, an input manipulation such as a depressing operation is performed for the lighting switch 37 with the power switch 38 being in the On state, whereby switching over the turning-on and turning-off of the first and second lighting LEDs 86 and 87 is performed.

When the lighting device 83 is used as a lighting stand, with respect to the turning-on and the turning-off of the first and second lighting LEDs 86 and 87, the lighting device 83 may be configured such that any one of the lighting LEDs is turned on. Alternatively, with respect to the turning-on and the turning-off, the lighting device 83 may be configured such that a lighting to be turned on is switched over the first lighting LED 86 and the second lighting LED 87 or both the lighting LEDs are turned on in accordance with an input operation performed to the lighting switch 37.

In this image capturing system 81, in a case where the medium 6 which is installed to the medium installation face 5 is scanned, by depressing the scan switch 36 in the state in which the medium 6 is installed to the medium installation face 5, scanning is started. In this scanning process, the medium 6 is scanned by performing communication between the smartphone 2 and the lighting device 83 and operating both the smartphone 2 and the lighting device 83 in association with each other.

When the scanning is started, first, both the first and second lighting LEDs 86 and 87 are turned on. In this state, before the image data of the medium 6 is stored, the smartphone 2 determines whether or not there is a non-readable area based on the image data corresponding to the medium 6 which is acquired through the photographing process in the state in which both the first and second lighting LEDs 86 and 87 are turned on.

In the state in which both the first and second lighting LEDs 86 and 87 are turned on, in a case where it is determined that there is no non-readable area, the medium 6 disposed within the photographed area 7 is photographed in the state in which the lighting LEDs are turned on, and the image data 60 is stored in the recording unit 24 of the smartphone 2. Accordingly, the image capturing system 81 photographs the medium 6 and stores the image data under an optimal environment created by the first and second lighting LEDs 86 and 87, thereby scanning the medium 6.

On the other hand, in the state in which both the first and second lighting LEDs 86 and 87 are turned on, in a case where it is determined that there is a non-readable area, the medium 6 is photographed with switching over the state emitting light thereto using the first lighting LED 86 and the state emitting light thereto using the second lighting LED 87 being performed, and both resultant images are synthesized. In other words, the first lighting LED 86 and the second lighting LED 87 are alternately turned on, and images are acquired by photographing the medium 6 in the turned-on state of each lighting LED, and the images are synthesized.

Figure 17:
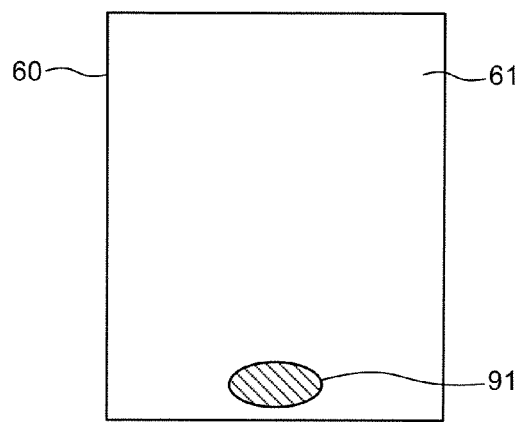

FIG. 17 is a schematic diagram illustrating an image which is captured with only the first lighting LED 86 being turned on. Since it is determined that there is a non-readable area in the state in which the first and second lighting LEDs 86 and 87 are turned on, in a case where only the first lighting LED 86 is turned on, a non-readable area is generated by only specularly reflecting emission light emitted from the first lighting LED 86 on the medium 6. Accordingly, in the image data 60 of the medium 6 which is acquired by photographing the photographed area 7 in the state in which only the first lighting LED 86 is turned on, at a position at which the emission light emitted from the first lighting LED 86 is specularly reflected on the medium 6, a first non-readable area 91 which is a non-readable area due to the light is generated. In the state in which both the first and second lighting LEDs 86 and 87 are turned on, in a case where it is determined that there is a non-readable area, by photographing the medium in the state in which only the first lighting LED 86 is turned on, image data 60 including the first non-readable area 91 is acquired.

Figure 18:
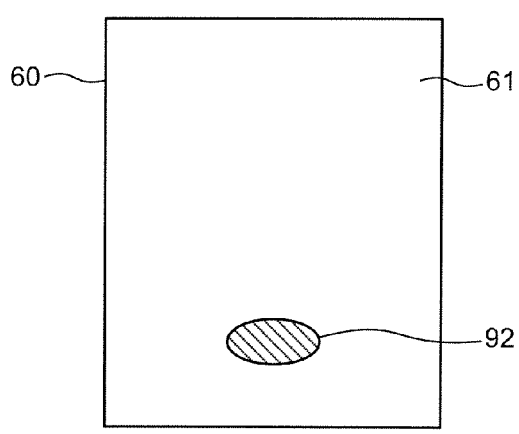

FIG. 18 is a schematic diagram illustrating an image which is captured with only the second lighting LED being turned on. In a case where only the second lighting LED 87 is turned on, a non-readable area is generated by only specularly reflecting emission light emitted from the second lighting LED 87 on the medium 6. Accordingly, in the image data 60 of the medium 6 which is acquired by photographing the photographed area 7 in the state in which only the second lighting LED 87 is turned on, at a position at which the emission light emitted from the second lighting LED 87 is specularly reflected on the medium 6, a second non-readable area 92 which is a non-readable area due to the light is generated.

At that time, since the first and second lighting LEDs 86 and 87 are disposed at mutually different positions and are disposed to emit light to the same emission range 8, the first and second lighting LEDs 86 and 87 emit light to the medium 6 from mutually different directions. Accordingly, a position at which the emission light emitted from the second lighting LED 87 is specularly reflected on the medium 6 is different from a position at which the emission light emitted from the first lighting LED 86 is specularly reflected on the medium 6, and therefore, the position of the second non-readable area 92 on the image data 60 is different from the position of the first non-readable area 91.

In the state in which both the first and second lighting LEDs 86 and 87 are turned on, in a case where it is determined that there is a non-readable area, by photographing the medium also in the state in which only the second lighting LED 87 is turned on, image data 60 including the second non-readable area 92 is acquired as well.

Figure 19:
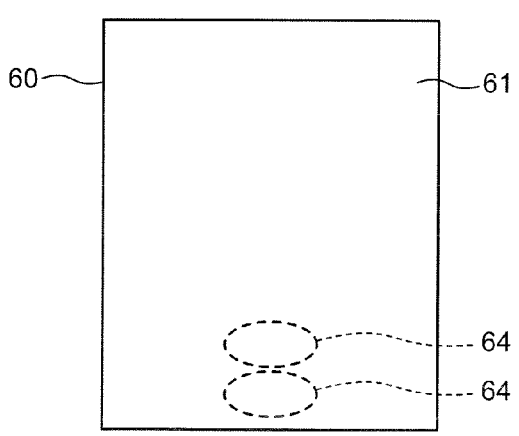

FIG. 19 is a schematic diagram illustrating an image which is acquired by synthesizing the image at the time when only the first lighting LED 86 is turned on and the image at the time when only the second lighting LED 87 is turned on. When the image data 60 in the state in which only the first lighting LED 86 is turned on and the image data 60 in the state in which only the second lighting LED 87 is turned on are acquired, the image capturing system 81 synthesizes both types of the image data 60. More specifically, the second non-readable area 92 included in the image data 60 acquired at the time when the second lighting LED 87 is turned on is replaced with a portion of the image data 60 acquired when only the first lighting LED 86 is turned on that corresponds to the second non-readable area 92.

In other words, among the image data 60 (see FIG. 17) acquired when only the first lighting LED 86 is turned on, a portion which corresponds to the second non-readable area 92 (see FIG. 18) of the image data 60 acquired when only the second lighting LED 87 is turned on is set as a replacement area 64, and the second non-readable area 92 of the image data 60 acquired when only the second lighting LED 87 is turned on is replaced with the replacement area 64. Since the replacement area 64 is positioned in the readable area 61 in the image data 60 acquired when only the first lighting LED 86 is turned on, information of the medium 6 can be read from the replacement area 64. Accordingly, the entire area of the image data 60 acquired by replacing the second non-readable area 92 with the replacement area 64 is a readable area 61, and therefore, information of the entire area of the medium 6 can be read.

When two units of the image data 60 are synthesized, a technique opposite thereto may be used. In other words, among the image data 60 (see FIG. 18) acquired when only the second lighting LED 87 is turned on, a portion which corresponds to the first non-readable area 91 (see FIG. 17) of the image data 60 acquired when only the first lighting LED 86 is turned on is set as a replacement area 64, and the first non-readable area 91 of the image data 60 acquired when only the first lighting LED 86 is turned on may be replaced with the replacement area 64. Accordingly, the entire area of the image data 60 acquired by replacing the first non-readable area 91 with the replacement area 64 is a readable area 61, and therefore, information of the entire area of the medium 6 can be read.

Figure 20:
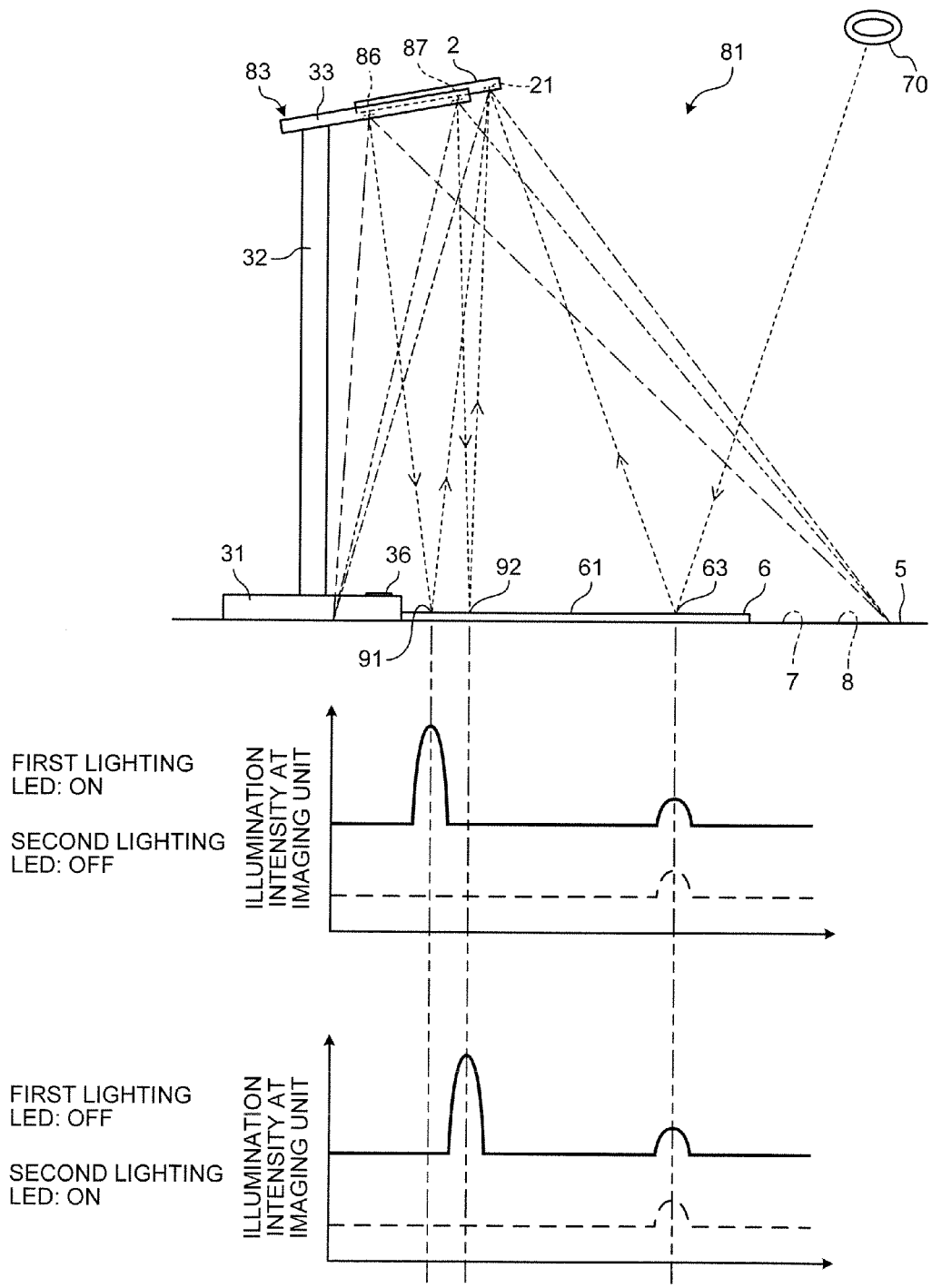

Next, the reason why the first non-readable area 91 and the second non-readable area 92 are generated due to specular reflection of light emitted from the first and second lighting LEDs 86 and 87 on the surface of the medium 6 will be described. FIG. 20 is a schematic diagram which illustrates dimmer control performed by the image capturing unit when the first and second lighting LEDs are turned on. In a case where the medium 6 specularly reflects the light emitted from the first lighting LED 86, in a case where the image capturing unit 21 is positioned on the optical path of the light specularly reflected on the medium 6 based on the positional relation between the first lighting LED 86 and the image capturing unit 21, the specularly reflected light is incident to the image capturing unit 21. Since a distance between the first lighting LED 86 and the medium 6 is much shorter than a distance between the external light 70 and the medium 6, as the amount of light received from the medium 6, the amount of light emitted from the first lighting LED 86 is much larger than that of light emitted from the external light 70. Accordingly, the light emitted from the first lighting LED 86 is specularly reflected on the medium 6, and the illumination intensity of the image capturing unit 21 at the time when the specularly reflected light is incident to the image capturing unit 21 is much higher than the illumination intensity of the image capturing unit 21 at the time when the light emitted from the external light 70 is specularly reflected on the medium 6.

In addition, the illumination intensity of the image capturing unit 21 at the time when the light emitted from the first lighting LED 86 is specularly reflected on the medium 6 is much higher than the illumination intensity of the photographed area 7 at the time when light diffused and reflected on the other portions is incident to the image capturing unit 21. Accordingly, the portion of the medium 6 on which the light emitted from the first lighting LED 86 is specularly reflected has very high illumination intensity and is a first non-readable area 91 from which the information of the medium 6 cannot be read.

Similarly, since a distance between the second lighting LED 87 and the medium 6 is short, the illumination intensity of the image capturing unit 21 at the time when the light emitted from the second lighting LED 87 is specularly reflected on the medium 6 and is incident to the image capturing unit 21 is much higher than the illumination intensity of the photographed area 7 at the time when light diffused and reflected on the other portions is incident to the image capturing unit 21. Accordingly, the portion of the medium 6 on which the light emitted from the second lighting LED 87 is specularly reflected has very high illumination intensity and is a second non-readable area 92 from which the information of the medium 6 cannot be read.

Accordingly, in a case where the surface of the medium 6 to be photographed is formed to have a high degree of smoothness and have a gloss on the surface thereof, a first non-readable area 91 and a second non-readable area 92 are generated in the image data 60. In the image capturing system 81 according to the second embodiment, in a case where such areas are generated in the image data 60, the image data 60 of the medium 6 is acquired when only the first lighting LED 86 is turned on, and the image data 60 is acquired when only the second lighting LED 87 is turned on, and such image data 60 is synthesized together. Next, a change in the image data 60 before and after the synthesis will be described.

FIG. 21 is a schematic diagram which illustrates a synthesizing technique used for synthesizing image data acquired when only the first lighting LED 86 is turned on and image data acquired when only the second lighting LED 87 is turned on. The image luminance component acquired when the first lighting LED 86 is turned on and the second lighting LED 87 is turned off is within an appropriate range of 0 to 255 in portions other than the first non-readable area 91. On the other hand, the luminance of only the portion corresponding to the first non-readable area 91 is much higher than that of the other portions, and accordingly, the image luminance component is in the state exceeding 255, and the image luminance component is in the saturated state. Accordingly, in the first non-readable area 91, the luminance is too high to read information of the medium 6.

Similarly, the image luminance component acquired when the second lighting LED 87 is turned on and the first lighting LED 86 is turned off is within an appropriate range of 0 to 255 in portions other than the second non-readable area 92. On the other hand, the luminance of only the portion corresponding to the second non-readable area 92 is much higher than that of the other portions, and accordingly, the image luminance component is in the state exceeding 255, and the image luminance component is in the saturated state. Accordingly, in the second non-readable area 92, the luminance is too high to read information of the medium 6.

In addition, when the first lighting LED 86 and the second lighting LED 87 are turned on, the luminance level of the entirety of the photographed area 7 becomes high, and accordingly, in order to limit the amount of entering light by using the image capturing unit 21, specularly reflected light of the external light 70 is incident to the image capturing unit 21. Accordingly, the amount of entering light entering from the external-light specular reflection area 63 (see FIG. 20), from which the information of the medium 6 is difficult to read, decreases. Therefore, the luminance level of the external-light specular reflection area 63 is near the luminance level of the other portions, which facilitates reading the information of the medium 6.

When the image data 60 acquired when only the first lighting LED 86 is turned on and the image data 60 acquired when only the second lighting LED 87 is turned on are synthesized together, a portion (portion D in FIG. 21) which corresponds to the second non-readable area 92 at the time when only the second lighting LED 87 is turned on is replaced with a portion (portion C in FIG. 21) which corresponds to the second non-readable area 92 at the time when only the second lighting LED 87 is turned on in the image data 60 acquired when only the first lighting LED 86 is turned on. As a result, in the image data 60 after the synthesis, the luminance level of the entire area is within an appropriate range of 0 to 255.

Next, the control sequence of the image capturing system 81 which scans the medium 6 by synthesizing the image data 60 acquired by switching over turning-on and turning-off of the first and second lighting LEDs 86 and 87 will be described. FIG. 22 is a flowchart which illustrates a control sequence at the time of scanning a medium in the image capturing system illustrated in FIG. 13. When the medium 6 is scanned by the image capturing system 81, the scan switch 36 is depressed to be turned on in the state in which the power switch 38 is turned on in Step ST201. When the scan switch 36 is recognized to be turned on by the control unit 40, by performing communication between the communication unit 45 of the lighting device 83 and the communication unit 22 of the smartphone 2, a scan start instruction is transmitted from the lighting device 83 to the smartphone 2. The smartphone 2 which has received the scan start instruction starts the photographing process by operating the image capturing unit 21.

In addition, when the scan switch 36 is turned on, the lighting device 83 determines whether or not both the first and second lighting LEDs 86 and 87 are turned on in Step ST202. Since the turned-on/off states of both of the first and second lighting LEDs 86 and 87 are controlled by the LED driver 41 of the control unit 40, the control unit 40 determines whether or not both the first and second lighting LEDs 86 and 87 are turned on based on the control states of the first and second lighting LEDs 86 and 87 in the LED driver 41.

According to this determination, in a case where it is determined that both the first and second lighting LEDs 86 and 87 are not turned on (No in Step ST202), both the first and second lighting LEDs 86 and 87 are turned on in Step ST203. In other words, in a case where at least one of the first and second lighting LEDs 86 and 87 is determined to be turned off, by controlling at least one of the first and second lighting LEDs 86 and 87 using the LED driver 41 of the control unit 40, both the first and second lighting LEDs 86 and 87 are turned on.

On the other hand, in a case where it is determined that the both the first and second lighting LEDs 86 and 87 are turned on (Yes in Step ST202), it is determined whether or not there is a non-readable area in Step ST204. In other words, it is determined whether there is a first non-readable area 91 or a second non-readable area 92 using the non-readable area determining unit 25 based on the image data 60 acquired by the smartphone 2 which has started the photographing process.

According to this determination, in a case where it is determined that there is no non-readable area (No in Step ST204), the photographed area 7 is photographed by the smartphone 2 in Step ST205. In other words, in a case where it is determined that any one of the first and second non-readable areas 91 and 92 is not generated, the photographing process is performed in the state in which both the first and second lighting LEDs 86 and 87 are turned on. Accordingly, the medium 6 disposed in the photographed area 7 is read, and the image data 60 of the medium 6 which is in the state in which the first non-readable area 91 or the second non-readable area 92 is not generated is read.

On the other hand, in a case where it is determined that there is a non-readable area (Yes in Step ST204), only the first lighting LED 86 is turned on in Step ST206. In other words, in a case where it is determined that at least one of the first and second non-readable areas 91 and 92 is generated, an instruction for turning on the first lighting LED 86 and turning off the second lighting LED 87 is transmitted from the smartphone 2 to the lighting device 83 through the communication unit 22 of the smartphone 2 and the communication unit 45 of the lighting device 83. The lighting device 83 turns off the second lighting LED 87 and maintains the turned-on state of only the first lighting LED 86 based on this instruction.

When only the first lighting LED 86 is turned on, a lighting switching completion signal is transmitted from the lighting device 83 to the smartphone 2, and the smartphone 2 which has received this signal photographs the photographed area 7 in the state in which only the first lighting LED 86 is turned on in Step ST207. Accordingly, first, the image data 60 of the medium 6 which is in the state in which the first non-readable area 91 is generated is read.

Subsequently, by controlling the first and second lighting LEDs 86 and 87 using the LED driver 41 of the control unit 40, only the second lighting LED 87 is turned on in Step ST208. In other words, when the photographing process is performed by the smartphone 2, an instruction for turning off the first lighting LED 86 and turning on the second lighting LED 87 is transmitted from the smartphone 2 to the lighting device 83 through the communication unit 22 of the smartphone 2 and the communication unit 45 of the lighting device 83. The lighting device 83 turns off the first lighting LED 86 and turns on only the second lighting LED 87 based on this instruction.

When only the second lighting LED 87 is turned on, a lighting switching completion signal is transmitted from the lighting device 83 to the smartphone 2, and the smartphone 2 which has received this signal photographs the photographed area 7 in the state in which only the second lighting LED 87 is turned on in Step ST209. Accordingly, the image data 60 of the medium 6 which is in the state in which the second non-readable area 92 is generated is read.

Next, an image is synthesized in Step ST210. In other words, the image data 60 (Step ST207) which is acquired by performing the photographing process in the state in which only the first lighting LED 86 is turned on and the image data 60 (Step ST209) which is acquired by performing the photographing process in the state in which only the second lighting LED 87 is turned on are synthesized by the image processing unit 23 of the smartphone 2. Accordingly, the second non-readable area 92 included in the image data 60 acquired by performing the photographing process in the state in which only the second lighting LED 87 is turned on is replaced with the replacement area 64 which is an area of the same range included in the image data 60 acquired by performing the photographing process in the state in which only the first lighting LED 86 is turned on.

When the images are synthesized, the image after the synthesis is stored in the recording unit 24 of the smartphone 2 in Step ST211. In addition, also in a case where the image of the medium 6 is acquired by photographing the photographed area 7 in Step ST205 after it is determined that there is no non-readable area (No in Step ST204), this image is stored in the recording unit 24 of the smartphone 2 in Step ST211.

When the image is stored, the first and second lighting LEDs 86 and 87 are returned to the original states in Step ST212. In other words, when the image is stored, the smartphone 2 transmits an image storage completion signal to the lighting device 83. The lighting device 83 which has received this signal sets the turned-on states of the first and second lighting LEDs 86 and 87 as the turned-on states at the time of starting the scanning process. When the first and second lighting LEDs 86 and 87 are returned to the original states, the process exits from one cycle of the control sequence.

The image capturing system 81 repeats the cycle of the control sequence while communicating with the smartphone 2 and the lighting device 83, thereby operating the smartphone 2 and the lighting device 83 in association with each other. Accordingly, the image capturing system 81 scans the medium 6 which is installed to the medium installation face 5 and stores a resultant image in the smartphone 2.

The image capturing system 81 according to the second embodiment described above is equipped with the first lighting LED 86 and the second lighting LED 87 and, in a case where it is determined that there is a non-readable area, photographs the medium 6 in the states switched over the emission from the first lighting LED 86 and the emission from the second lighting LED 87. Accordingly, an image of a portion which becomes a non-readable area at the time when one lighting is turned on can be acquired as a readable area 61 at the time when the other lighting is turned on. Accordingly, for example, by replacing the second non-readable area 92 included in the image data 60 acquired when the second lighting LED 87 is turned on and the same area included in the image data 60 acquired when the first lighting LED 86 is turned on with each other, an image in which there is no non-readable area can be acquired more reliably. As a result, a high-quality image can be acquired more reliably.

Modified Example

In the above-described image capturing systems 1 and 81, while the LED driver 41 is configured to perform switching over the lighting LED 39 and the first and second lighting LEDs 86 and 87, the LED driver 41 may be configured to adjust such amounts of light through pulse width modulation (PWM) control or the like. In other words, the control unit 40 including the LED driver 41 may be disposed to perform driving control for adjusting the amounts of light of the lighting LED 39 and the first and second lighting LEDs 86 and 87. In such a case, it is preferable that the lighting switch 37 not only perform switching between the turning-on and the turning-off of the lighting LED 39 and the first and second lighting LEDs 86 and 87 but be used as an input unit which adjusts the amounts of light emitted from the lighting LED 39 and the first and second lighting LEDs 86 and 87.

As above, by setting the amounts of light emitted from the lighting LED 39 and the first and second lighting LEDs 86 and 87 to be adjustable, in a case where it is determined that there is a non-readable area, an image from which a non-readable area is eliminated can be acquired by not only performing switching between the turning-on and the turning-off but also photographing the medium 6 with the amounts of light being adjusted. For example, in the image capturing system 1 according to the first embodiment, in a case where it is determined that there is the non-readable area 62 by the non-readable area determining unit 25, the smartphone 2 photographs the medium 6 in the states in which the amount of light emitted from the lighting LED 39 is differently set by the control unit 40, image data corresponding to the medium 6 may be generated by synthesizing readable areas 61 included in the image data 60 generated in the photographing processes. Accordingly, in accordance with the generation of the non-readable area 62, even in a case where images are synthesized, an image having less correction after the combination can be acquired, whereby a high-quality image can be acquired more reliably.

In addition, in the above-described image capturing systems 1 and 81, in a case where a non-readable area is generated when the lighting LED 39 and the first and second lighting LEDs 86 and 87 are turned on, while the image processing is performed to eliminate the non-readable area, any other image processing may be performed. For example, since the color temperature of emission light emitted from the lighting LED 39 and the first and second lighting LEDs 86 and 87 may be different from the color temperature of the ambient light of emission light emitted from the external light 70, dimmer control may be performed such that the color temperature of the lighting LED 39 and the first and second lighting LEDs 86 and 87 matches the color temperature of the ambient light. Accordingly, in one unit of the image data 60, the tones of color can be aligned in a portion near the peripheral edge of the image data 60 which is influenced greatly by the ambient light and in a portion near the center of the image data 60 which is influenced less by the ambient light. As a result, a high-quality image can be acquired more reliably.

Furthermore, in the above-described image capturing systems 1 and 81, while the image data 60 acquired by performing the photographing process using the smartphone 2 is stored in the recording unit 24 of the smartphone 2, the image data 60 may be stored in a unit other than the smartphone 2. For example, when photographing is performed by the smartphone 2, the image data 60 may be transmitted to the lighting devices 3 and 83 and stored in the lighting devices 3 and 83. Alternatively, the image data may be transmitted to an external server and stored in the external server.

Furthermore, in the above-described image capturing systems 1 and 81, while the smartphone 2 is used as an image capturing unit which photographs the medium 6 installed to the medium installation face 5, any unit other than the smartphone 2 may be used as the image capturing unit. As the image capturing unit, for example, a digital camera having a function for communicating with the lighting devices 3 and 83 may be used. The form of the image capturing unit is not limited as long as the photographing process can be performed based on a scan trigger transmitted from the lighting devices 3 and 83 by communicating with the lighting devices 3 and 83.

According to the image capturing system and the method of generating image data of the present invention, there is an advantage of appropriately acquiring a high-quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing system comprising:
a base unit arranged on a medium installation face on which a medium that is a reading target is installed;
an arm unit extending upwardly from the base unit;
a top unit extending from the arm unit so as to face the medium installation face;
an image capturing unit configured to photograph the medium;
a lighting disposed in the top unit and configured to irradiate the medium installation face;
a lighting control unit configured to control driving of the lighting; and
a non-readable area determining unit configured to determine whether or not there is a non-readable area from which the image capturing unit is unable to read information of the medium due to reflected light of the lighting by the medium, based on an image corresponding to the medium that is acquired by performing a photographing process in a turned-on state of the lighting before image data of the medium captured by the image capturing unit is stored,
wherein, when the non-readable area determining unit determines that there is the non-readable area, a lighting state of the lighting is set to be different by the lighting control unit, and the medium is photographed by the image capturing unit in states in which the lighting states are different from each other, and
wherein, among the image data generated in each photographing process, image data corresponding to the medium is generated by synthesizing areas except for an area corresponding to the non-readable area.

2. The image capturing system according to claim 1,
wherein the lighting state is the amount of light of the lighting, and
wherein, when the non-readable area determining unit determines that there is the non-readable area, the image capturing unit photographs the medium in states in which the amounts of light of the lighting are differently set by the lighting control unit.

3. The image capturing system according to claim 2, wherein, when the non-readable area determining unit determines that there is the non-readable area, the image capturing unit photographs the medium in states in which the amounts of light of the lighting are differently set to a turned-on state and a turned-off state by the lighting control unit.

4. The image capturing system according to claim 1, wherein the lighting includes a first lighting and a second lighting, which are disposed at mutually different positions and irradiate the medium installation face, wherein the lighting states are a state in which the medium is irradiated using the first lighting and a state in which the medium is irradiated using the second lighting, and wherein, when the non-readable area determining unit determines that there is the non-readable area, the image capturing unit photographs the medium in states in which irradiation to the medium installation face is switched over irradiation using the first lighting and irradiation using the second lighting by the lighting control unit.

5. The image capturing system according to claim 1, wherein the top unit includes a mounting face to mount the image capturing unit at a position for photographing the medium installed on the medium installation face.

6. The image capturing system according to claim 1, wherein, after the medium is photographed by the image capturing unit, the lighting control unit returns a lighting state of the lighting to a lighting state before the photographing.

7. A method of generating image data in an image capturing system that includes:

a base unit arranged on a medium installation face on which a medium that is a reading target is installed;

an arm unit extending upwardly from the base unit;

a top unit extending from the arm unit so as to face the medium installation face;

an image capturing unit configured to photograph the medium; and a lighting disposed in the top unit and configured to irradiate the medium installation face, the method comprising:

performing a first photographing process in a turned-on state of the lighting to acquire an image corresponding to the medium;

determining whether there is a non-readable area from which the image capturing unit is unable to read information of the medium due to reflected light of the lighting in the medium based on the image corresponding to the medium that is acquired in the first photographing process;

setting lighting states of the lighting so that the lighting states are different from each other in a case where it is determined that there is the non-readable area in the determining step;

performing second photographing process to photograph the medium in states in which the lighting states are different from each other by using the image capturing unit;

generating image data corresponding to the medium by synthesizing areas except for an area corresponding to the non-readable area among image data generated in the second photographing process; and storing the image data generated in the generating step.

* * * * *